(12) United States Patent
Matsumoto et al.

(10) Patent No.: US 8,159,564 B2
(45) Date of Patent: Apr. 17, 2012

(54) SIGNAL-PROCESSING METHOD, SIGNAL-PROCESSING SYSTEM, AND SEMICONDUCTOR DEVICE CONFIGURED TO DETECT PHYSICAL-QUANTITY DISTRIBUTION

(75) Inventors: Ken Matsumoto, Kanagawa (JP); Yasuaki Hisamatsu, Kanagawa (JP); Daisaku Izumi, Kanagawa (JP); Fuminori Sato, Kanagawa (JP); Masahiro Itoh, Kanagawa (JP); Ryouko Saikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1048 days.

(21) Appl. No.: 11/265,849

(22) Filed: Nov. 3, 2005

(65) Prior Publication Data
US 2006/0109359 A1 May 25, 2006

(30) Foreign Application Priority Data

Nov. 4, 2004 (JP) ................................ P2004-320265

(51) Int. Cl.
*H04N 5/262* (2006.01)
(52) U.S. Cl. ..................................... 348/240.2; 348/479
(58) Field of Classification Search ............... 348/207.1, 348/211.14, 240.2, 423.1, 425.1, 434.1, 435.1, 348/460, 473, 474, 476, 477, 478, 479; 386/4, 386/12, 61, 84, 201, 202
See application file for complete search history.

(56) References Cited

U.S. PATENT DOCUMENTS

| | | | | |
|---|---|---|---|---|
| 4,910,599 A * | 3/1990 | Hashimoto | ................ | 348/240.2 |
| 5,394,486 A * | 2/1995 | Eisenbarth et al. | ........... | 382/309 |
| 5,815,211 A * | 9/1998 | Umei | .............................. | 348/478 |
| 5,896,171 A * | 4/1999 | Suzuki | ...................... | 348/211.14 |
| 6,008,854 A * | 12/1999 | Shimizu | ........................ | 348/445 |
| 6,437,830 B1 * | 8/2002 | Horlander | ...................... | 348/478 |
| 6,573,931 B1 * | 6/2003 | Horii et al. | ................ | 348/211.14 |
| 7,053,950 B2 * | 5/2006 | Kubo | .............................. | 348/312 |
| 7,366,406 B2 * | 4/2008 | Hoshino et al. | ................ | 386/125 |
| 7,376,188 B2 * | 5/2008 | Seo et al. | .................. | 375/240.26 |
| 7,430,682 B2 * | 9/2008 | Carlson et al. | ................ | 713/500 |

(Continued)

FOREIGN PATENT DOCUMENTS

JP 2000-032348 A 1/2000
JP 2003-153286 5/2003

OTHER PUBLICATIONS

Japanese Patent Office, Office Action issued in Patent Application JP 2004-320265, on Jan. 5, 2010.

(Continued)

*Primary Examiner* — Nhan T Tran
*Assistant Examiner* — Chriss Yoder, III
(74) *Attorney, Agent, or Firm* — SNR Denton US LLP

(57) ABSTRACT

A signal-processing method adapted to perform predetermined signal processing based on a unit signal transmitted from a semiconductor device that includes at least two unit components arranged in a predetermined order, where each of the unit components includes a detection unit configured to detect change information responsive to a change in an incident physical quantity and a unit-signal-generation unit configured to generate the unit signal based on the change information, and that detects the distribution of the physical quantity is provided. The signal-processing method includes the steps of externally transmitting operation information that can specify an operation state of the semiconductor device from the semiconductor device and performing the predetermined signal processing based on the unit signal by referring to the operation information in a signal-processing unit provided outside the semiconductor device.

14 Claims, 13 Drawing Sheets

U.S. PATENT DOCUMENTS

2004/0017596 A1* 1/2004 Shimomura et al. .......... 358/538
2004/0151479 A1* 8/2004 Ogikubo ....................... 386/117
2006/0013507 A1* 1/2006 Kaneko et al. ................ 382/312
2008/0043123 A1* 2/2008 Shimomura et al. ....... 348/240.2

OTHER PUBLICATIONS

Japanese Office Action issued on Jan. 18, 2011 in connection with counterpart JP Application No. 2004-320265.

* cited by examiner

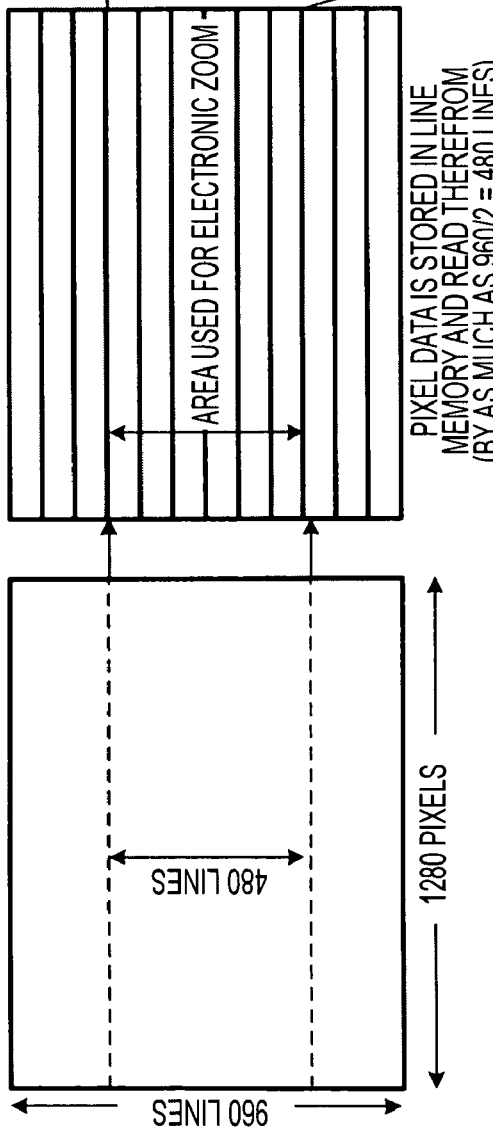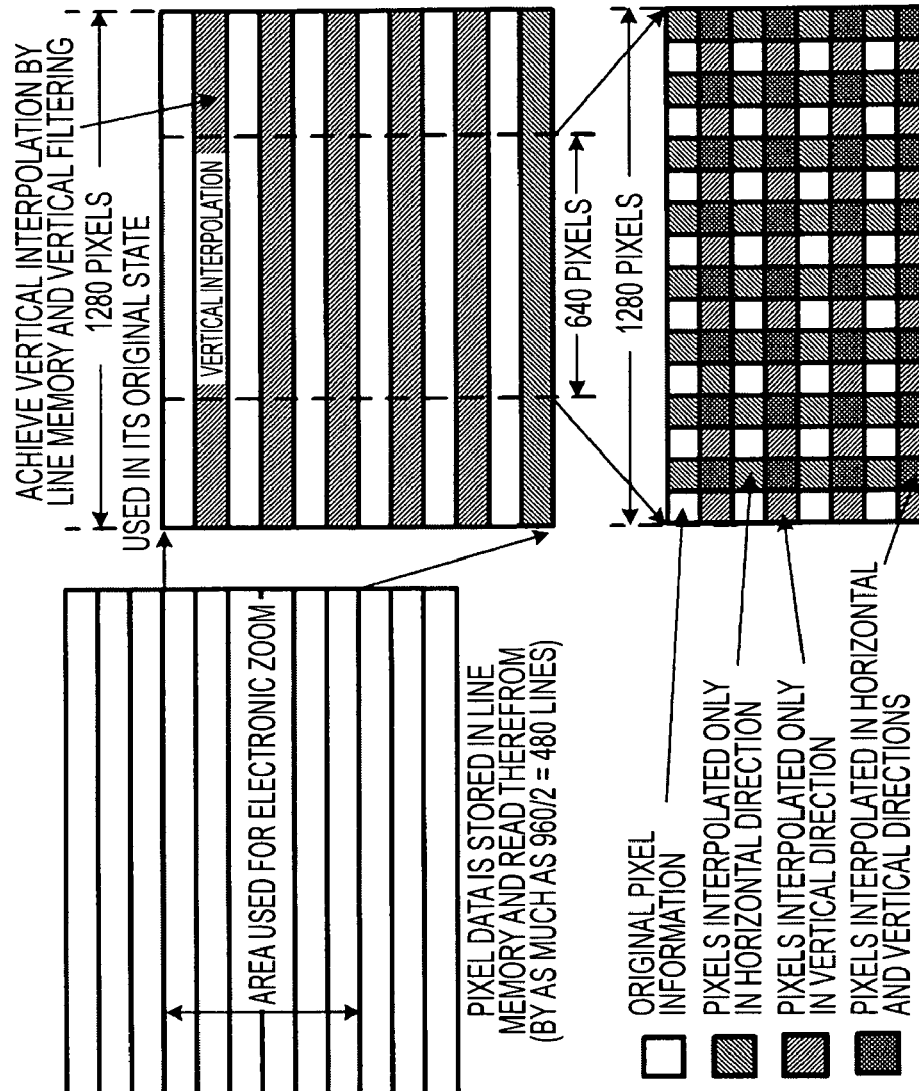
FIG. 6A
FIG. 6B
FIG. 6C
FIG. 6D

SIGNAL-PROCESSING METHOD, SIGNAL-PROCESSING SYSTEM, AND SEMICONDUCTOR DEVICE CONFIGURED TO DETECT PHYSICAL-QUANTITY DISTRIBUTION

CROSS REFERENCES TO RELATED APPLICATIONS

The present invention contains subject matter related to Japanese Patent Application JP 2004-320265 filed in the Japanese Patent Office on Nov. 4, 2004, the entire contents of which are incorporated herein by reference.

BACKGROUND OF THE INVENTION

1. Field of the Invention

The present invention relates to a signal-processing method, a signal-processing system, and a semiconductor device configured to detect the physical-quantity distribution (hereinafter often referred to as a physical-information-acquisition device). More specifically, the present invention relates to a signal-processing technology adapted to acquire information used for a predetermined object by reading a signal. The signal-processing technology is useful for a semiconductor device configured to detect the physical-amount distribution. The semiconductor device includes, for example, a solid-state image-pickup device that includes at least two unit components arranged in a predetermined manner. Each of the unit components has sensitivity to an externally-transmitted electromagnetic wave including light, an X-ray, and so forth. The solid-state image-pickup device can read the physical-quantity amount converted into an electric signal by each of the unit components. The signal-processing technology includes zoom processing, defective-pixel-correction processing, vertical-line-noise-correction processing, dynamic-range-enlargement processing, and so forth.

2. Description of the Related Art

Physical-amount-distribution-detection semiconductor device including at least two unit components (e.g., pixels) have been used in various fields. The unit components are arranged in a line or a matrix and each of the unit components has sensitivity to a change in the physical amount including an externally transmitted electromagnetic wave such as light, an X-ray, and so forth, and/or a pressure (contact or the like).

For example, in the field of video apparatuses, solid-state image-pickup devices including an image-pickup element (an image-pickup device) of the charge-coupled-device (CCD) type, the metal-oxide-semiconductor (MOS) type, or the complementary-metal-oxide-semiconductor (CMOS) type have been used, where the image-pickup element detects a change in light (an example electromagnetic wave), which is an example physical quantity. Here, the term "solid-state" denotes a semiconductor. An example of the above-described solid-state image-pickup element is disclosed in "Kazuya Yonemoto "Foundation and Application of CCD/CMOS Image Sensor", CQ Publishing, 2003, Aug. 10, first edition".

For example, since the solid-state image-pickup elements such as a CCD image sensor or a COM image sensor are increasingly downsized and low priced, various types of video apparatuses using the solid-state image-pickup element, such as a digital still camera configured to photograph a still image, a mobile phone with a camera, a video camera configured to photograph a moving image, and so forth have become widely available. Particularly, since the power consumption and cost used for manufacturing the CMOS image sensor are lower than those of the CCD image sensor, the CMOS image sensors receive attention, as image sensors that will replace the CCD image sensors in future.

As the semiconductor technology progresses in recent years, the number of pixels used in the solid-state image-pickup element is rapidly increased. For example, solid-state-image-pickup elements with several million pixels have been developed and used for digital still cameras and movie-video cameras, so as to achieve high resolution therein. Particularly, the CMOS image sensor is a solid-state image-pickup device having a photoelectric-conversion element and a read circuit in each of the pixels. Since the pixels can be randomly accessed and data can be read therefrom with high speed, the CMOS sensors receive much attention, as promising sensors.

Further, in the field of computer apparatuses, fingerprint-identification devices configured to detect the fingerprint-image information based on a change in the electrical characteristic and/or the optical characteristic on the basis of a pressure. The fingerprint-identification devices read the physical-quantity amount converted into an electrical signal by the unit components (corresponding to pixels in the solid-state image-pickup device).

The above-described solid-state image-pickup devices include amplification solid-state image-pickup devices including a pixel-signal-generation unit configured to generate a pixel signal responsive to a signal electrical charge generated by an electrical-charge-generation unit. The pixel-signal-generation unit includes at least one pixel that is formed, as an amplification solid-state image-pickup element (referred to as an active pixel sensor (APS) or a gain cell) having an amplification-drive transistor such as a static-induction transistor, a MOS transistor, and so forth. For example, many of the CMOS solid-state image-pickup devices have the above-described configuration.

Where the pixel signal is read from the amplification solid-state image-pickup device, address control is performed for a pixel unit including the arranged unit components so that the pixel signals transmitted from the unit pixels are arbitrarily selected and read. Namely, the amplification solid-state image-pickup device is provided, as an address-control solid-state image-pickup device.

For example, where the amplification solid-state image-pickup element is formed, as an X-Y-address solid-state image-pickup element including unit pixels arranged in a matrix, each of the unit pixels is formed, as a MOS active element (a MOS transistor), so that each of the unit pixels has the amplification function. Namely, a signal electrical charge (a photoelectron) accumulated in a photodiode functioning as the photoelectric-conversion element is amplified by the active element and read, as image information.

In the above-described X-Y-address solid-state image-pickup element includes, for example, a pixel unit having many pixel transistors arranged in a two-dimensional matrix. In the pixel unit, accumulation of the signal electrical charges corresponding to incident light is started for every line (row) or pixel and the current or voltage signals corresponding to the accumulated signal electrical charges are read in a predetermined order from the pixels according to address specification.

Here, in the MOS (including CMOS) transistor, the pixel transistors corresponding to a single line are accessed at one time and pixel signals are read from the pixel unit in lines. In many cases, the pixel signals corresponding to the single line are read and transmitted to the output side in sequence. For example, the signals of the pixels arranged in a matrix are transmitted to a vertical-signal line in lines and further transmitted from the vertical-signal line in a horizontal direction to a horizontal-read line in sequence.

FIG. 11 shows an example configuration of an image-pickup device 801 using an ordinary CCD image-pickup element. FIG. 12 is a timing chart showing example operation timing of the image-pickup device 801. An image-pickup device 801 forms a camera system by using the CCD image-pickup element. The image-pickup device 801 includes a CCD solid-state image-pickup element 802 that has an image-pickup unit (an image-element unit) 810 including many photodetection sensors such as photodiodes, as a main unit, an analog-signal-processing unit 820 configured to perform desired signal processing for an analog image-pickup signal transmitted from the solid-state image-pickup element 802, and a signal-conversion unit 824 configured to convert the analog image-pickup signal that is processed and transmitted from the analog-signal-processing unit 820 into digital image-pickup data.

Further, the image-pickup device 801 is formed, as a large-scale-integrated circuit (LSI) configured to perform signal processing. The signal-processing LSI includes a digital-signal processor (DSP) or the like. The image-pickup device 801 includes a post-stage-signal processing unit 826 configured to perform desired signal processing for the digital-image-pickup data transmitted from the signal-conversion unit 824 and a control unit 840 configured to control the solid-state image-pickup element 802 and the post-stage signal-processing unit 826. The control unit 840 is formed, as a CCD-control LSI such as a CCD driver. The post-stage-signal processing unit 826 and the control unit 840 are configured to control each other.

The solid-state image-pickup element 802 includes a sensor-circuit unit 813 configured to drive the image-pickup unit 810 and an amplification-and-drive unit 819 configured to amplify and externally transmit an analog pixel signal transmitted from the solid-state image-pickup element 802.

In the above-described image-pickup device 801, an image-pickup signal transmitted from the CCD solid-state image-pickup element 802 is an analog signal. As shown in FIG. 12, timing-control signals generated by the post-stage-signal-processing unit 826 and/or the control unit 840 are transmitted and/or received in frames. An analog-signal transmitted from the solid-state image-pickup element 802 is A/D-converted by the signal-conversion unit 824 and image-pickup data is transmitted line by line to the post-stage-signal processing unit 826 in a parallel (see FIG. 12) or serial manner in a data-output period in a single horizontal period.

The post-stage-signal-processing unit 826 receives the image-pickup data line by line in a horizontal-blanking period, for example, and performs desired signal processing line by line, so as to generate the image corresponding to a single frame. Further, the solid-state image-pickup element 802 does not transmit a control signal or the like in the horizontal-blanking period.

FIG. 13 shows an example configuration of an image-pickup device 851 using an ordinary CMOS image-pickup element. The operation timing of the image-pickup device 851 is the same as that shown in the timing chart of FIG. 12.

Where the CMOS image-pickup element is used, peripheral circuits including a driver function, a signal-amplification unit, an A/D-conversion unit, and so forth can be formed by the same process as that of an image-pickup unit 860. Therefore, the peripheral circuits and the image-pickup unit 860 are formed on one and the same semiconductor substrate. Namely, the peripheral circuits are included in a sensor. The above-described configuration is referred to as a system-on-chip configuration (refer to Chapter 7 of "Foundation and Application of CCD/CMOS image sensor" ). FIG. 13 shows the above-described system-on-chip configuration.

Te image-pickup device 851 using the CMOS image-pickup element includes, for example, the image-pickup unit (a pixel-element unit) 860 including many photodetection sensors such as photodiodes, a sensor-circuit unit 863 configured to drive the image-pickup unit 860, an analog-signal-processing unit 870 configured to perform desired signal processing for an analog image-pickup signal transmitted from the image-pickup unit 860, and a signal-conversion unit 874 configured to convert the analog image-pickup signal that is processed and transmitted from the analog-signal-processing unit 870 into digital image-pickup data. The above-described units 860, 863, 870, and 874 are provided on one and the same semiconductor substrate.

Further, the image-pickup device 851 is a signal-processing LSI including the DSP or the like. The image-pickup device 851 includes a control-and-signal-processing unit 880 having a post-stage signal-processing unit configured to perform desired signal processing for the digital image-pickup data transmitted from the signal-conversion unit 874 and a control unit configured to control the sensor-circuit unit 863 and the analog-signal-processing unit 870. The control-and-signal-processing unit 880 and the image-pickup unit 860 are provided on one and the same semiconductor substrate.

Thus, in the image-pickup device 851 including the analog-signal-processing unit 870, the signal-conversion unit 874, the control-and-signal-processing unit 880, and the CMOS image-pickup unit 860 that are provided on one and the same semiconductor substrate, timing-control signals generated by the control-and-signal-processing unit 880 are transmitted and/or received in frames, analog signals transmitted from the analog-signal-processing unit 870 are A/D-converted by the signal-conversion unit 874, and image-pickup data is transmitted line by line to the control-and-signal-processing unit 880 in a data-output period in a single-horizontal period in a parallel manner (see FIG. 12) or a serial manner.

The control-and-signal-processing unit 880 receives the image-pickup data line by line in a horizontal-blanking period, for example, and performs desired signal processing lien by line, so as to generate the image corresponding to a single frame. Further, the signal-conversion unit 874 does not transmit a control signal or the like in the horizontal-blanking period.

Thus, in the camera system using the known image-pickup element performs timing control in frames by using an LSI other than the image-pickup element including the DSP, the CCD driver, and so forth. Although image signals are transmitted from the image-pickup element in lines, the image signals are controlled at predetermined timing in frames and subjected to signal processing in frames.

Further, when performing a function having a higher value added, the image signals are also controlled in frames. For example, where gain adjustment, zoom (image enlargement) processing, and so forth are performed, control signals (e.g., operation-timing signals) are transmitted and received in frames among a plurality of chips including the CCD solid-state image-pickup element 802, the control unit 840 having the CCD driver or the like, the signal-conversion unit 824, the post-stage-processing unit 826, and so forth. Image data divided in frames is subjected to one and the same signal processing line by line.

The difference between the CCD image-pickup device shown in FIG. 11 and the CMOS image-pickup device shown in FIG. 13 is described below. In the CMOS image-pickup device, the analog-signal processing unit 870, the signal-conversion unit 874, and the control-and-signal-processing unit 880 are provided on the same semiconductor substrate as that of the CMOS image-pickup unit 860. Further, the image-pickup device 851 itself functions, as the CMOS solid-state image-pickup element.

Therefore, in the CMOS image-pickup device, the image signals are also controlled in frames, where the function having the higher value added is performed. Further, control signals (e.g., operation-timing signals) are transmitted and received in frames among the control-and-signal-processing unit 880, the analog-signal-processing unit 870, and the signal-conversion unit 874. Image data divided in frames is subjected to the one and the same signal processing line by line.

SUMMARY OF THE INVENTION

In recent years, a camera system that can achieve a higher-level function than in the past is demanded. However, known control-and-signal-processing configurations are insufficient to respond to such a demand without using a complicated configuration and increasing the cost of making the system.

For example, image-pickup elements in recent years have become multifunctional, so as to be used for a digital still camera, a mobile phone with a camera, and so forth. Namely, the image-pickup elements meet various specifications so that they can achieve a zoom function, a dynamic-range function, and so forth. Especially, when performing a function in which the details of signal processing is changed line by line in real time, where the function includes the zoom function, the dynamic-range function, and so forth, the DSP may require at least two functions, that is, the function of acquiring information about the operation timing (especially output-data timing) of the image-pickup element and the function of storing the details on output data (a line memory).

Therefore, in the above-described configuration, the gate size, chip size, and power consumption of the DSP are increased, which makes it difficult to add a new function or increase the performance of the camera system including the image-pickup element and the DSP by using a simple configuration at low cost. Subsequently, it is difficult to provide a digital still camera or a mobile phone with a camera that is low priced and capable of functioning with stability.

Accordingly, the present invention is adapted to present a system that can perform highly sophisticated signal processing without making the configuration of a semiconductor such as an image-pickup element complicated and increasing the cost of forming the system.

A signal-processing method according to an embodiment of the present invention is adapted to perform predetermined signal processing on a unit signal transmitted from a semiconductor device that includes at least two unit components arranged in a predetermined order, where each of the unit components includes a detection unit configured to detect change information responsive to a change in an incident physical quantity and a unit-signal-generation unit configured to generate the unit signal based on the change information, and that detects the distribution of the physical quantity. The signal-processing method includes the steps of externally transmitting operation information that can specify an operation state of the semiconductor device from the semiconductor device and performing the predetermined signal processing on the unit signal by referring to the operation information in a signal-processing unit provided outside the semiconductor device.

A signal-processing system according to another embodiment of the present invention is configured to perform the above-described signal-processing method. The semiconductor device includes an operation-information-output unit configured to externally transmit operation information that can specify an operation state of the semiconductor device. A signal-processing unit configured to perform the predetermined signal processing on the unit signal by referring to the operation information is provided.

A semiconductor apparatus according to another embodiment of the present invention is used for performing the above-described signal-processing method. The semiconductor apparatus includes an operation-information-output unit configured to externally transmit operation information adapted to specify an operation state of the semiconductor device.

Further, the above-described embodiments can be modified so that a signal-processing method, a signal-processing system, and a semiconductor device according to more effective embodiments of the present invention are provided.

For example, where the operation information is externally transmitted from the semiconductor device, the operation information and the unit signal may be separately transmitted from different output terminals. However, both the operation information and the unit signal may be externally transmitted from a common output terminal.

Further, where both the operation information and the unit signal are transmitted from the common output terminal, the operation information and the unit signal are collectively converted into a single signal and externally transmitted from the common output terminal. That is to say, the operation information and the unit signal in effect may be transmitted from the common output terminal at one time. Otherwise, the operation information and the unit signal may be transmitted in a time-division manner. More specifically, the operation information and the unit signal may be transmitted from the common output terminal at different times.

Further, it is preferable that the operation information is externally transmitted in every single horizontal period and/or single vertical period in which the unit signal is externally transmitted. Where the operation information and the unit signal are transmitted from the common output terminal in the time-division manner, it is preferable that the operation information corresponding to the single horizontal period and/or the single vertical period is externally transmitted after the unit signal corresponding to the single horizontal period and/or the single vertical period is externally transmitted in the every single horizontal period and/or the every single vertical period.

According to the above-described embodiments of the present invention, the semiconductor device externally transmits an ordinary unit signal and operation information adapted to specify the current operation state of the semiconductor device. Further, the signal-processing device outside the semiconductor device performs predetermined signal processing on the unit signal transmitted from the semiconductor device by referring to the operation information transmitted from the semiconductor device.

Subsequently, the signal-processing unit provided outside the semiconductor device can perform the predetermined signal processing by referring to the operation information in concert with the semiconductor device.

BRIEF DESCRIPTION OF THE DRAWINGS

FIG. 6A also shows the known zoom function;

FIG. 6B also shows the known zoom function;

FIG. 6C also shows the known zoom function;

FIG. 6D also shows the known zoom function;

DESCRIPTION OF THE PREFERRED EMBODIMENTS

Hereinafter, embodiments of the present invention will be described in details with reference to the attached drawings. In the following embodiments, a CMOS image-pickup element, which is an example X-Y-address solid-state image-pickup element, is used, as an image-pickup device.

However, the image-pickup device may not be a MOS image-pickup device. That is to say, every semiconductor device configured to detect the physical-quantity distribution can be used, as the above-described image-pickup device, where the semiconductor device includes a plurality of unit components arranged in lines and/or matrix. Each of the unit components senses an externally transmitted electromagnetic wave including light, an X-ray, and so forth.

<Configuration of Image-Pickup Device>

Figure 1A:
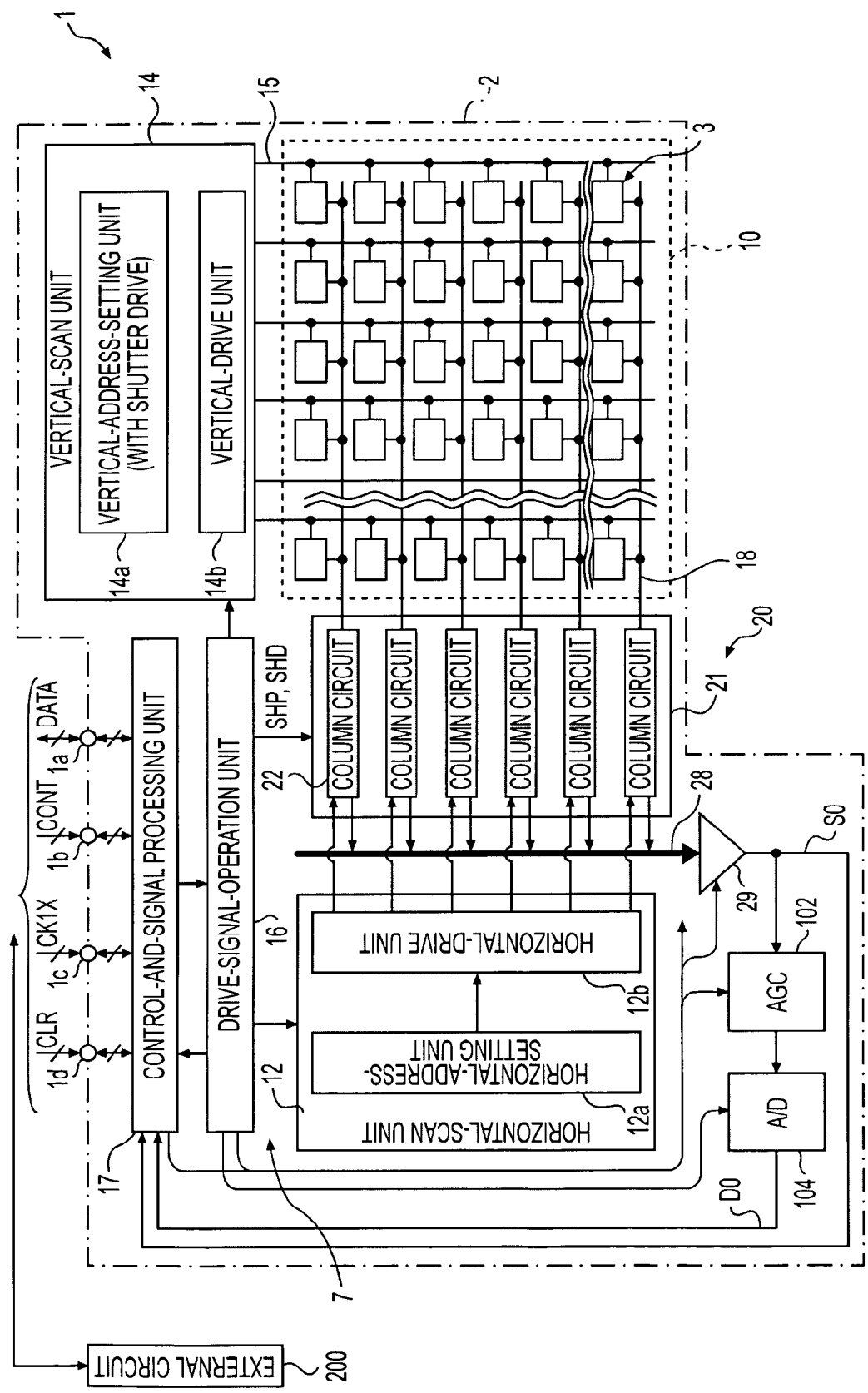
FIG. 1A shows a schematic configuration of an image-pickup device using a CMOS solid-state image-pickup element according to an embodiment of the present invention.
Figure 1B:
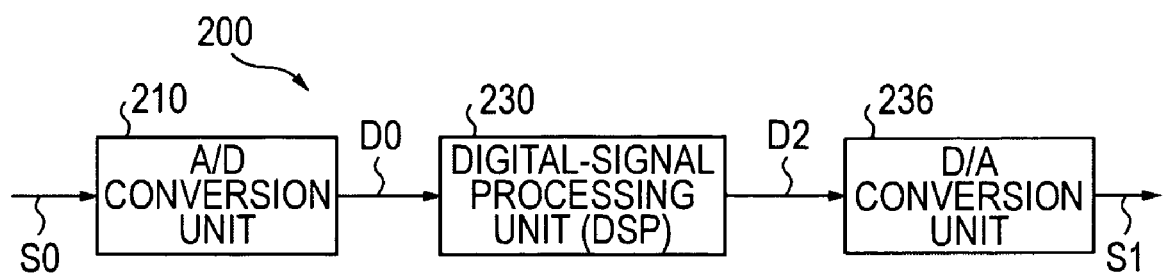
FIG. 1B also shows the schematic configuration of the image-pickup device shown in FIG. 1A.

FIGS. 1A and 1B are schematic diagrams of an image-pickup device 1 according to an embodiment of the present invention, where the image-pickup device 1 includes a CMOS solid-state image-pickup element. Here, FIG. 1A shows the configuration of the entire image-pickup device 1 and FIG. 1B shows the configuration of an external circuit 200 following a CMOS solid-state image-pickup element 2. The image-pickup device 1 can be used, as an electronic still camera and/or a factory-automation (FA) camera that can pick up a color image, for example.

The image-pickup device 1 includes an image-pickup unit 10 including at least two unit pixels 3 arranged in rows and columns that form a tetragonal-lattice shape (a two-dimensional matrix). Here, each of the unit pixels 3 includes a photodetection element functioning as a detector (not shown) configured to externally output the signal corresponding to an incident-light quantity, where each of the unit pixels 3 externally transmits a voltage signal. The image-pickup unit 10 is formed, as a column-type image-pickup unit, so that a correlated-double-sampling (CDS) unit and at least one different functional unit are provided for each vertical column.

Namely, the image-pickup device 1 includes the solid-state image-pickup element 2 and the external circuit 200, as shown in FIG. 1A. The solid-state image-pickup element 2 has the image-pickup unit (image-element unit) 10 functioning as an area sensor. The image-pickup unit 10 includes the plurality of unit pixels 3 (image elements provided as example unit components) arranged in rows and columns (two-dimensional matrix). The solid-state image-pickup element 2 further includes a drive-control unit 7 provided outside the image-pickup unit 10 and a column-processing unit 21 which is a functional unit of an analog front end 20 including a column-signal-processing unit (referred to as a column circuit in FIG. 1A) 22 provided for each of vertical columns.

The drive-control unit 7 includes a horizontal-scan unit 12 and a vertical-scan unit 14, for example. The drive-control unit 7 further includes a drive-signal operation unit (an example read-address-control device) 16 configured to transmit a control pulse at a predetermined time to each of the functional units of the image-pickup device 1, where the functional units includes the horizontal-scan unit 12, the vertical-scan unit 14, and the column-signal-processing unit 21. The horizontal-scan unit 12 and the vertical-scan unit 14 are collectively referred to as a sensor-circuit unit 13. The sensor-circuit unit 13 drives each of the unit pixels 3 of the image-pickup unit 10 according to a control signal transmitted from a control-and-signal processing unit 17.

Further, according to the embodiment, the drive-control unit 7 includes the control-and-signal processing unit 17. The control-and-signal processing unit 17 has an interface unit that externally transmits an analog image-pickup signal S0 and/or digital image-pickup data D0, and that receives a clock signal, a control signal, and so forth that are externally transmitted thereto, so as to control the image-pickup unit 10, and an additional circuit unit configured to generate a control signal and/or perform signal processing related to the solid-state image-pickup element 2, where the signal processing is performed, so as to correct a vertical-stripe noise that occurs due to a defective pixel of the image-pickup unit 10 and the circuit configuration of the column-processing unit 21. The details on the above-described configuration will be described later.

The control-and-signal-processing unit 17 transmits various control signals to the drive-signal-operation unit 16 and the analog-signal-processing unit 20, so as to control the drive-signal-operation unit 16 and the analog-signal-processing unit 20. Further, the drive-signal-operation unit 16 transmits the feedback information (referred to as control-feedback information) corresponding to control information transmitted from the control-and-signal-processing unit 17 to the control-and-signal-processing unit 17.

The solid-state image-pickup element 2 includes various interface terminals so that analog and/or digital signals of various kinds are transmitted and/or received between the control-and-signal-processing unit 17 and the external circuit

200. In FIG. 1A, a terminal 1a is provided, as an interface used for digital data DATA, a terminal 1b is provided, as an interface used for a control signal, a terminal 1c is provided, as an interface used for a clock signal CK1X, and a terminal 1d is provided, as an interface used for a clear signal CLR.

The solid-state image-pickup element 2 according to the above-described embodiment externally transmits internal-operation information thereof to the external circuit 200 by using the above-described interface terminals (e.g., at least one digital-output terminal). Here, the internal-operation information is transmitted independently of the image-pickup signal S0 and the image-pickup data D0 that are collectively referred to as image information.

Further, the image information and the internal-operation information of the solid-state image-pickup element 2 can be transmitted to the external circuit 200 via interface terminals that are independent of each other. However, where the image information and the internal-operation information are transmitted to the external circuit 200 in a time-division manner, the image information and the information in the image-pickup element can be externally transmitted via a common terminal in real time. Subsequently, the number of the interface terminals can be reduced. The image information and the internal-operation information may be transmitted in the time-division manner by using a vertical (V) blanking period and/or a horizontal (H) blanking period. That is to say, where the image information and the internal-operation information are transmitted in the time-division manner, the image data is externally transmitted and/or read in any period other than the blanking period. Subsequently, no signal other than the image data can be externally transmitted. Therefore, the pickup-image-element internal information is transmitted in the blanking period.

The above-described elements of the drive-control unit 7 and the image-pickup unit 10 are integrally formed on a semiconductor area including a single-crystal silicon by using the same technology as the semiconductor-integrated-circuit manufacturing technology, whereby the solid-state image-pickup element 2 which is an example semiconductor system is provided.

The image-pickup unit 10 receives light, converts the light into an analog signal, and transmits the analog signal to the analog-signal processing unit 20. For the sake of simplicity, part of the rows and columns is not shown in FIG. 1. In reality, however, from several tens to several thousands of the unit pixels 3 are provided along each of the lines and columns of the image-pickup unit 10. Further, though not shown, a color-separation filter having predetermined color coding is provided in each of the pixels 3 provided in the image-pickup unit 10. Still further, though not shown, each of the pixels of the image-pickup unit 10 includes a photoelectric-conversion element including a photodiode or the like and a transistor circuit.

Load-transistor units are provided on signal paths between the column-processing unit 21 and the horizontal-scan unit 12, where each of the load transistor units includes a load MOS transistor (not shown) having a drain end. The drain ends are connected to vertical signal lines 18. Further, load-control units, that is, load-MOS controllers configured to drive and control the load-MOS transistors are provided.

Each of the unit pixels 3 is connected to the vertical-scan unit 14 via a vertical-control line 15 used for selecting a vertical column and the column-processing unit 21 via a vertical-signal line 18. Each of the horizontal-scan unit 12 and the vertical-scan unit 14 includes a shift register or the like and starts performing a shift operation (scanning) in response to a drive-pulse signal transmitted from the drive-signal-operation unit 16. The vertical-control line 15 includes various pulse signals used for driving the unit pixel 3.

The horizontal-scan unit 12 includes a horizontal-address-setting unit 12a configured to determine a horizontal read column, that is, an address in a horizontal direction. Here, the determination of the read column denotes selecting the separate column-signal-processing units 22 provided in the column-processing unit 21. The horizontal-scan unit 12 further includes a horizontal-drive unit 12b configured to lead signals transmitted from the column-processing unit 21 to a horizontal-signal line 28 according to a read address determined by the horizontal-address-setting unit 12a. The horizontal-address setting unit 12a has a shift register and/or a decoder, though not shown, so as to select pixel-information items transmitted from the column-signal-processing unit 22 in sequence. Then, the horizontal-address setting unit 12a transmits the selected pixel-information items to the horizontal-signal line 28. Namely, the horizontal-address setting unit 12a functions, as a selection unit.

The vertical-scan unit 14 includes a vertical-address-setting unit 14a configured to determine a vertical read row (an address with reference to a vertical direction) and a horizontal read column (an address with reference to a horizontal direction). Here, the above-described determination denotes selecting a predetermined row of the image-pickup unit 10. The vertical-scan unit 14 further includes a vertical-drive unit 14b configured to transmit a pulse signal to the control line corresponding to the unit pixel 3 on the read address (in the horizontal-row direction) determined by the vertical-address-setting unit 14a and drive the unit pixel 3.

The vertical-address-setting unit 14a includes a vertical-shift register and/or a decoder configured to exert basic control over a row from which a signal is read, and a shutter-shift register configured to control a row for an electronic shutter. Where the shutter-shift resistor is driven, the vertical-address-setting unit 14a selects a predetermined row of the unit element 3 in the same way as when the vertical-address-setting unit 14a operates under normal conditions. However, the vertical-address-setting unit 14a adjusts a gap between the read row selected in an ordinary way and a shutter row so that a time period where the photoelectric-conversion element is exposed to light (accumulation time) is adjusted.

Each of the vertical-shift register and/or the decoder is configured to select the pixels in rows, where the pixel information is read from the image-pickup unit 10. The vertical-shift register and/or the decoder, and the vertical-drive unit 14b for each of the rows form a signal-output-row-selection unit. The shutter-shift register is configured to select the pixels in rows, so as to perform an electronic-shutter operation. The shutter-shift register and the vertical-drive unit 14b for each of the rows form an electronic-shutter-row-selection unit.

The drive-signal-operation unit 16 transmits a horizontal-address signal to the horizontal-address-setting unit 12a and a vertical-address signal to the vertical-address-setting unit 14a. Subsequently, the horizontal-address-setting unit 12a selects the row corresponding to the horizontal-address signal and the vertical-address-setting unit 14a selects the column corresponding to the vertical-address signal.

Further, the drive-signal-operation unit 16 may be presented, as a semiconductor-integrated circuit independent of other functional elements including the image-pickup unit 10, the horizontal-scan unit 12, and so forth. In that case, an image-pickup device including the image-pickup unit 10, the horizontal-scan unit 12, and so forth, and the drive-signal-operation unit 16 form an image-pickup device, as an example semiconductor system. The image-pickup device may be presented, as an image-pickup module including peripheral signal-processing circuits, a power-source circuit, and so forth.

The column-processing unit 21 functioning as a read circuit includes the column-signal-processing unit 22 for each of the vertical columns. Upon receiving signals of pixels corresponding to a single row, the column-processing unit 21 processes the signals. Each of the column-signal-processing units 22 includes a signal-transfer switch and a storage capacity, for example.

The column-processing unit 21 may include a noise-removing function using the CDS processing. In that case, the column-processing unit 21 calculates the difference between the signal level immediately after the pixel is reset (noise level; zero level) and the true signal level for voltage-mode pixel information transmitted via the vertical-signal line 18, based on two sample pulses including a sample pulse SHP and a sample pulse SHD that are transmitted from the drive-signal-operation unit 16. Subsequently, noise-signal components including a fixed-pattern noise (FPN) caused by fixed variations in the pixels and a reset noise are removed.

Further, in the column-processing unit 21, an auto-gain-control (AGC) circuit and/or an analog-digital-converter (ADC) circuit that can amplify a signal, as required, may be provided for each of the columns, that is, the column-signal-processing units 22, at the post stage of the CDS-processing unit.

The voltage signal indicating the pixel information processed by the column-processing unit 21 is read at predetermined time via a horizontal-selection switch (not shown) driven by a horizontal-selection signal transmitted from the horizontal-scan unit 12 and transmitted to a horizontal-signal line 28. Then, the voltage signal is further transmitted to an output circuit 29 that is provided, as a functional unit of the analog-signal-processing unit 21 and that is connected to the rear end of the horizontal-signal line 28.

The output circuit 29 amplifies each of pixel signals transmitted from the image-pickup unit 10 via the horizontal-signal line 28 with an appropriate gain and transmits the amplified pixel signal to the external circuit 200 via the control-and-signal processing unit 17, as an image-pickup signal S0. The output circuit 29 may perform buffering only. Otherwise, the output circuit 29 may perform black-level adjustment, column-variation correction, signal amplification, color-related processing, and so forth before performing the buffering, as required.

Namely, in the column-type image-pickup device 1 according to the above-described embodiment, an output signal, that is, a voltage signal transmitted from the unit pixel 3 is transferred to the vertical-signal line 18, the column-processing unit 21, the horizontal-signal line 28, and the output circuit 29 in that order. As for the driving, the pixel-output signals corresponding to a single row are transmitted to the column-processing unit 21 in parallel via the vertical-signal lines 18, and the signals subjected to the CDS processing are serially transmitted via the horizontal-signal line 28.

As long as the pixels can be driven in vertical columns and/or horizontal columns, each of the pulse signals can be transmitted in either the horizontal-row direction or the vertical-column direction with reference to the unit pixel 3. Namely, drive-clock lines used for applying the pulse signals can be physically wired according to an arbitrary method.

The external circuit 200 of the image-pickup device 1 according to the above-described embodiment is provided on a substrate (a printed substrate or a semiconductor substrate), the substrate being independent of that of the solid-state image-pickup element including the image-pickup unit 10, the drive-control unit 7, and so forth that are integrally formed on one and the same semiconductor area. Therefore, the external circuit 200 has a circuit configuration that can support at least two photographing modes. The image-pickup device 1 includes the solid-state image-pickup element including the image-pickup unit 10, the drive-control unit 7, and so forth, and the external circuit 200. Here, the solid-state image-pickup element is provided, as an example semiconductor device or physical-information-acquisition device. The drive-control unit 7 may be separated from the image-pickup unit 10 and the column-processing unit 21 so that the image-pickup unit 10 and the column-processing unit 21 form the solid-state image-pickup element (an example semiconductor device). In that case, the solid-state image-pickup element and the drive-control unit 7 separated therefrom may form a solid-state image-pickup device (an example physical-information-acquisition device)

As shown in FIG. 1B, the external circuit 200 includes, for example, an analog-to-digital (A/D) conversion unit 210 configured to convert an analog image-pickup signal S0 transmitted from the output circuit 29 into digital image-pickup data D0 and a digital-signal processor (DSP) unit 230 configured to perform digital-signal processing on the image-pickup data D0 digitized by the A/D-conversion unit 210.

The digital-signal-processing unit 230 functions, as a digital-amplification unit configured to amplify a digital signal transmitted from the A/D-conversion unit 210 to an appropriate level and transmit the amplified digital signal. Further, for example, the digital-signal-processing unit 230 performs color-separation processing for the digital signal and generates image-data RGB representing an image red (R), an image green (G), and an image blue (B). Still further, the digital-signal-processing unit 230 performs other signal processing for the image data RGB, thereby generating image data D2 transferred to a monitor. The digital-signal-processing unit 230 includes a functional unit configured to perform signal-compression processing, so as to store image-pickup data in a storage medium.

Further, the external circuit 200 includes a digital-to-analog (D/A) conversion unit 236 configured to convert the image data D2 digitized by the digital-signal-processing unit 230 into an analog image signal S1. The image signal S1 transmitted from the D/A-conversion unit 236 is transmitted to a display device such as a liquid-crystal monitor. An operator can perform various operations including switching an image-pickup mode to another, for example, while seeing a menu or an image produced on the display device.

Further, the external circuit 200 according to the above-described embodiment controls the camera-system control, the zoom function, the dynamic-range function, and so forth that had been controlled by the known DSP (corresponding to the external circuit 200) in the past by using the solid-state image-pickup element 2 (feedback-to-DSP control) with reference to the internal-operation information of the solid-state image-pickup element 2, where the internal operation is transmitted from the solid-state image-pickup element 2. The above-described configuration will be described later in detail. Subsequently, the processing load on the DSP outside the solid-state image-pickup element is reduced and the capability and added value of the camera system increase. For example, the external circuit 200 performs various functions including the zoom function and the dynamic-range function in which the details on signal processing vary from line to line. Further, the external circuit 200 performs an internal-state-confirmation function, so as to inform a user of the internal-operation state of the signal-processing part provided in the control-and-signal-processing unit 17.

Here, the internal-operation information is used, as information necessary for performing predetermined signal processing in the external circuit 200 provided, as a signal-processing LSI (DSP) provided at the post stage of the solid-state image-pickup element 2. The internal-operation information includes information about the meaning of the next-line read (output) data (thinning, line-unit correction, and so forth) and the address of an H line for which access is currently made (zoom-operation-start position or the like).

According to the above-described embodiment, the external circuit 200 configured to perform the signal processing is provided outside the solid-state image-pickup element 2 (chip), that is, at the post stage of the solid-state image-pickup element 2. However, the entire external circuit 200 or part thereof (for example, a single function unit of the analog-signal processing unit 20, such as an AGC unit 102, an A/D-conversion unit 104, and a digital-amplification unit that is not shown) may be provided in a chip and the image-pickup data D0 may be transmitted from the output terminal 1d. In that case, the A/D-conversion unit 210 may not be provided in the external circuit 200.

In the above-described image-pickup device 1, a CMOS-image sensor is formed. The CMOS-image sensor selects the pixels of the image-pickup unit 10 in horizontal rows in sequence by using the horizontal-scan unit 12, the vertical-scan unit 14, and the drive-signal-operation unit 16 that controls the above-described scan units 12 and 14, and reads information about the selected pixels corresponding to a single horizontal row at one time.

<Example configuration of Control-and-signal-processing unit>

Figure 2:
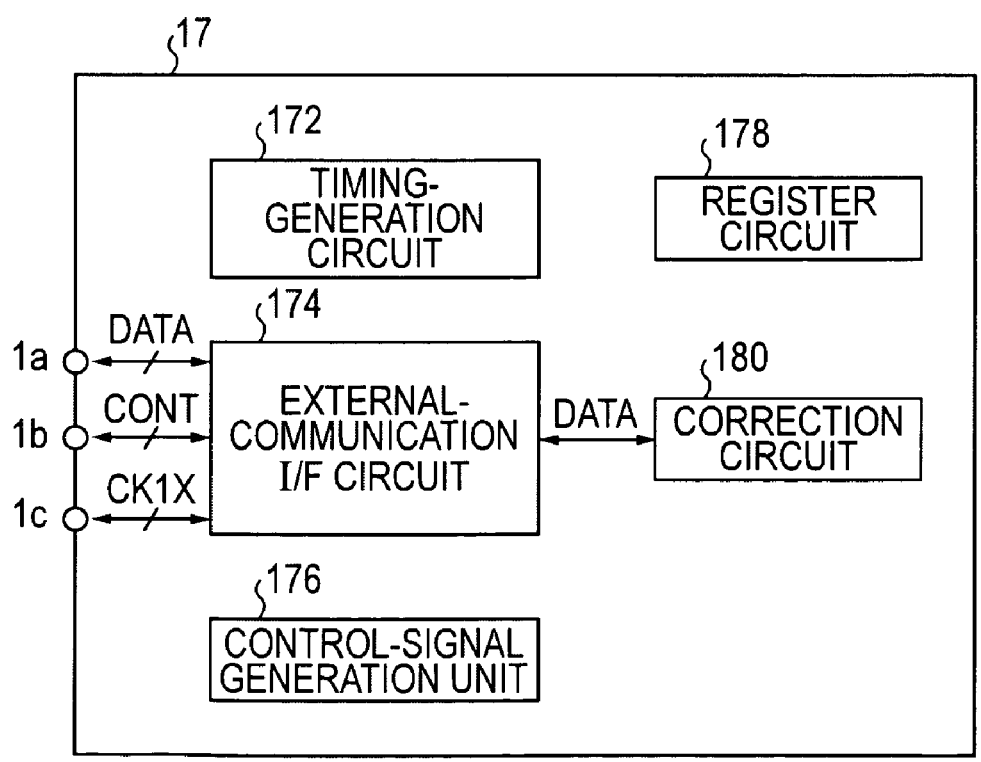
FIG. 2 is a functional block diagram illustrating an example control-and-signal-processing unit.

FIG. 2 is a functional block diagram illustrating an example configuration of the control-and-signal-processing unit 17. The control-and-signal-processing unit 17 includes a timing-generation-circuit unit 172 which is a functional block of a timing generator TG (an example read-address-control device) configured to transmit a clock signal and/or a pulse signal that is transmitted at a predetermined time and that is required for operating each of the functional units of the solid-state image-pickup element 2. The control-and-signal-processing unit 17 further includes an external-communication IF-circuit unit 174 which is a functional block of a communication interface configured to receive control data specifying an operation mode or the like via the terminal 1b, receive an input clock signal CK1X via the terminal 1c, and transmit data DATA including information about the operation state of the solid-state image-pickup element 2 to the external circuit 200 via the terminal 1a. The control-and-signal-processing unit 17 further includes a control-signal-generation unit 176 configured to generate control information of various types used for controlling the drive-signal-operation unit 16 and the analog-signal-processing unit 20.

Further, the control-and-signal-processing unit 17 includes a register-circuit unit 178 configured to set an initial value of a sensor operation and a correction-circuit unit 180 configured to correct a defective pixel of the image-pickup unit 10.

The external-communication I/F-circuit unit 174 can control the time where various data items are transmitted to and/or from the solid-state image-pickup element 2. Further, the control-and-signal-processing unit 17 includes a digital-output unit 175 configured to externally transmit not only image information but also internal-operation information indicating the operation state of the solid-state image-pickup element 2 and information about the amount of correction performed by the correction-circuit unit 180 to the external circuit 200 that is provided at the post stage of the solid-state image-pickup element 2 and that includes a signal-processing LSI or other LSI. The external-communication I/F-circuit unit 174 transmits internal-state information to the external circuit 200 via the digital-output unit 175, where the internal-state information is required for performing the signal processing through the signal-processing LSI (DSP) that corresponds to the external circuit 200 in this embodiment and that follows the solid-state image-pickup element 2. Here, the internal-state information may be transmitted to the external circuit 200 on a per-line basis (the time period corresponding to several lines in a single frame), a per-line-and-frame basis, or at all times.

<First Embodiment>
(Operations of Image-Pickup Device)

Figure 3:
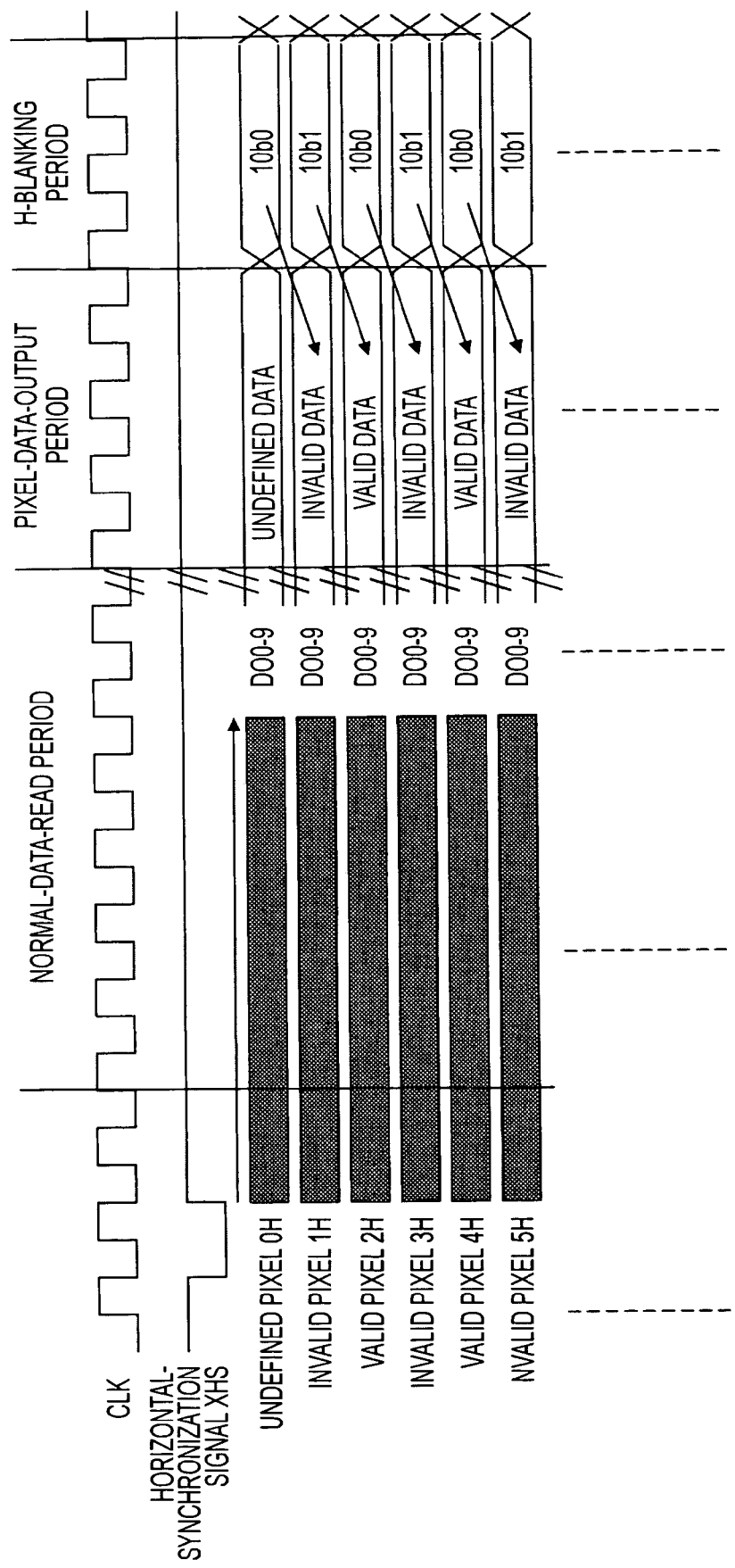
FIG. 3 is a timing chart illustrating operations according to another embodiment of the present invention, where the operations are performed by the image-pickup device shown in FIG. 1.

FIG. 3 is a timing chart illustrating operations according to a first embodiment of the present invention, where the operations are performed by the image-pickup device 1 shown in FIG. 1. More specifically, FIG. 3 shows example operations performed for achieving the zoom function. Further, FIGS. 4A, 4B, 5, 6A, 6B, 6C, and 6D are provided to show the difference between the zoom function according to the first embodiment, a known zoom function, and a modified zoom function.

The example operations according to the first embodiment will be described, as below. Under normal conditions, the image-pickup device 1 externally transmits image data alone by using the digital-output terminal 1a from which the image data D0 is transmitted. However, where the image-pickup device 1 is set to a special mode, the image-pickup device 1 transmits a signal indicating the meaning of data externally transmitted at the time where the next line is accessed to the external circuit 200, as a signal for confirming the internal operation of the solid-state image-pickup element 2, separately from the image data D0, in a horizontal-blanking period in a single horizontal period specified by a horizontal-synchronization signal XHS. Subsequently, the external circuit 200 refers to the internal-operation information corresponding to the signal indicating the meaning of data externally transmitted at the time where the next line is accessed and performs the zoom function, where the details on signal processing of the zoom function vary from line to line.

More specifically, first, the control-and-signal processing unit 17 generates a drive signal necessary for controlling each of the function units of the solid-state image-pickup element 2 based on the externally transmitted clock signal CK1K, where the function units includes the image-pickup unit 10, the sensor-circuit unit 13, the analog-signal-processing unit 20, and the A/D-conversion units 104 and 210. Then, the control-and-signal processing unit 17 transmits control signals required for driving the function units in sequence so that the control signal is transmitted to the function unit corresponding thereto. For example, the control-and-signal processing unit 17 transmits a pixel-drive signal to each of the unit pixels 3 via the sensor-circuit unit 13 and the vertical-control line 15.

At the same time, an electrical charge generated by converting light made incident from outside is accumulated in each of the unit elements 3 of the image-pickup unit 10. The accumulated electrical charge is read from each of the unit pixels 3 based on the pixel-drive signal and transmitted to the analog-signal-processing unit 20.

The analog-signal-processing unit 20 amplifies the read signal (an analog signal) transmitted from the image-pickup unit 10 and transmits the amplified signal to the A/D-conversion unit 104. The A/D-conversion unit 104 digitizes and transmits the amplified read signal to the control-and-signal-processing unit 17, as digital image-pickup data D0.

The control-and-signal-processing unit 17 corrects the transmitted image-pickup data D0 through the correction-circuit unit 180, as required, and transmits the corrected data from the digital-output unit 175 to the external circuit 200 in a parallel manner or a serial manner, as data on the solid-state image-pickup element 2.

Where the image-pickup data is read from the solid-state image-pickup element 2, a single horizontal-line period includes a time period where the image-pickup data D0 can be externally transmitted (hereinafter often referred to as a data-output period) and a time period where the image-pickup-data D0 is not externally transmitted (hereinafter often referred to as a horizontal-blanking period) due to the configuration of the image-pickup unit 10.

Therefore, the external-communication I/F-circuit unit 174 transmits the internal-operation information of the solid-state image-pickup element 2 from the digital-output unit 175 to the signal-processing LSI (DSP) and/or other LSI (the external circuit 200 in the first embodiment) provided at the post stage of the solid-state image-pickup element 2 in real time, as several bits of digital data, by using the horizontal-blanking period. Here, the internal-operation information is transmitted, so as to change the details on signal processing performed by the signal-processing LSI.

For example, according to the example operations of the first embodiment, the solid-state image-pickup element 2 transmits a thinning signal (access-line-address signal) to the external circuit 200 before the next line us accessed (data transmission) so that the external circuit 200 can perform the zoom function. Here, the thinning signal shows whether the next line data according to the zoom magnification is invalid (10b0) or valid (10b1). Namely, the thinning signal indicates the meaning of data externally transmitted when the next line is accessed. The thinning signal is transmitted before the next line is accessed, so as to inform the external circuit 200 of whether or not the line data corresponding to the next line should be acquired, where the next line is accessed.

For example, upon receiving information about the zoom-magnification settings transmitted from the external circuit 200, the external-communication I/F-circuit unit 174 transmits the access-line-address signal according to the zoom magnification to the external circuit 200, as several bits (four bits in the first embodiment) of digital data obtained after valid data is externally transmitted by using the horizontal-blanking period, as shown in FIG. 3. In reality, the valid state and/or invalid state indicated by the thinning signal can be represented by the least significant bit (the LSB1 bit) of the four bits of digital data.

Figures 4A, 4B:
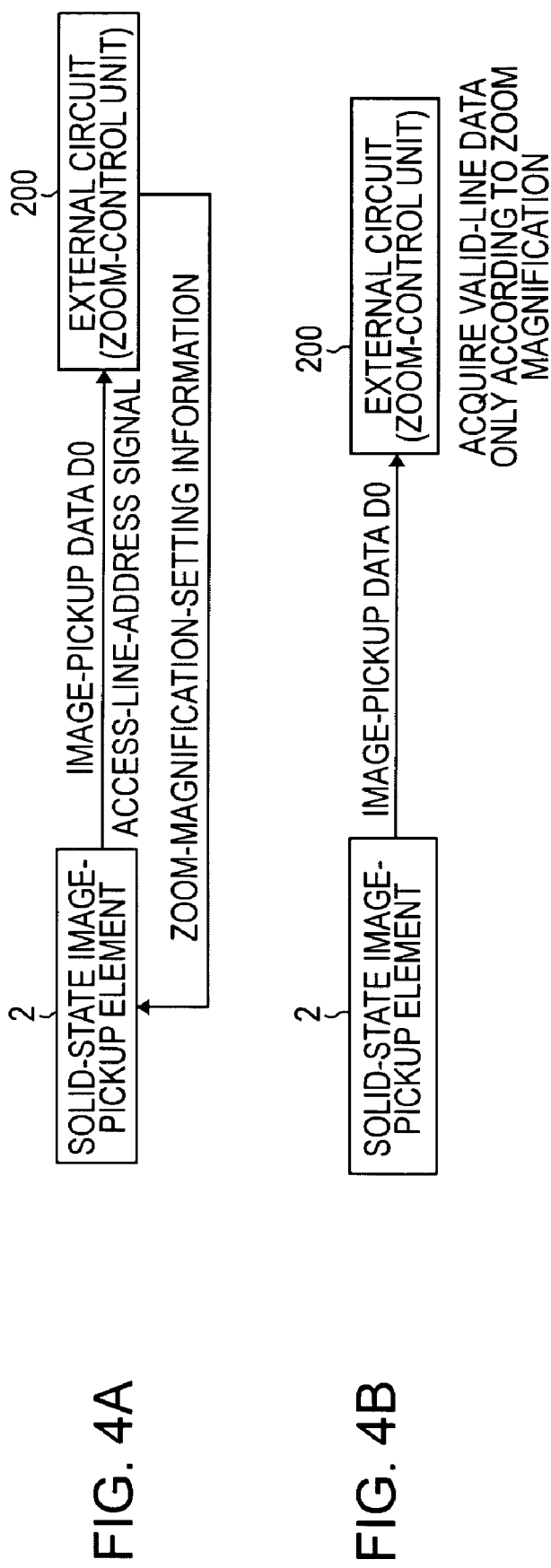
FIG. 4A is provided to show the difference between a zoom function according to the above-described embodiment and a zoom function achieved by modifying the above-described zoom function.
FIG. 4B is also provided to show the difference between the zoom function according to the above-described embodiment and the zoom function achieved by modifying the above-described zoom function.

The external circuit 200 performs the zoom function by acquiring only the data corresponding to the valid line of the image-pickup data D0 transmitted from the solid-state image-pickup element 2 based on the valid state and/or invalid state indicated by the access-line-address signal, as shown in FIG. 4A. Although the details on signal processing should be changed from line to line, so as to achieve the zoom function by using the external circuit 200, the external circuit 200 can perform the zoom function without using a frame memory by acquiring the line data in the above-described manner.

For example, in the case of an image-pickup device configured to pick up an image by using an image-pickup element (an image-pickup device) including a CCD image-pickup element, a CMOS image-pickup element, and so forth, it becomes possible to form the camera function mainly by using electronic parts, since a digital-image-signal processing LSI is used. Subsequently, zoom processing is performed electronically by performing resolution conversion without using an optical-zoom system. In that case, only a solid-state image-pickup device and the digital-image-signal-processing LSI achieve a zoom function used for a picked-up image by using a frame memory (or a field memory). The above-described system has been proposed in Japanese Unexamined Patent Application Publication No. 2000-295530, for example.

Figure 5:
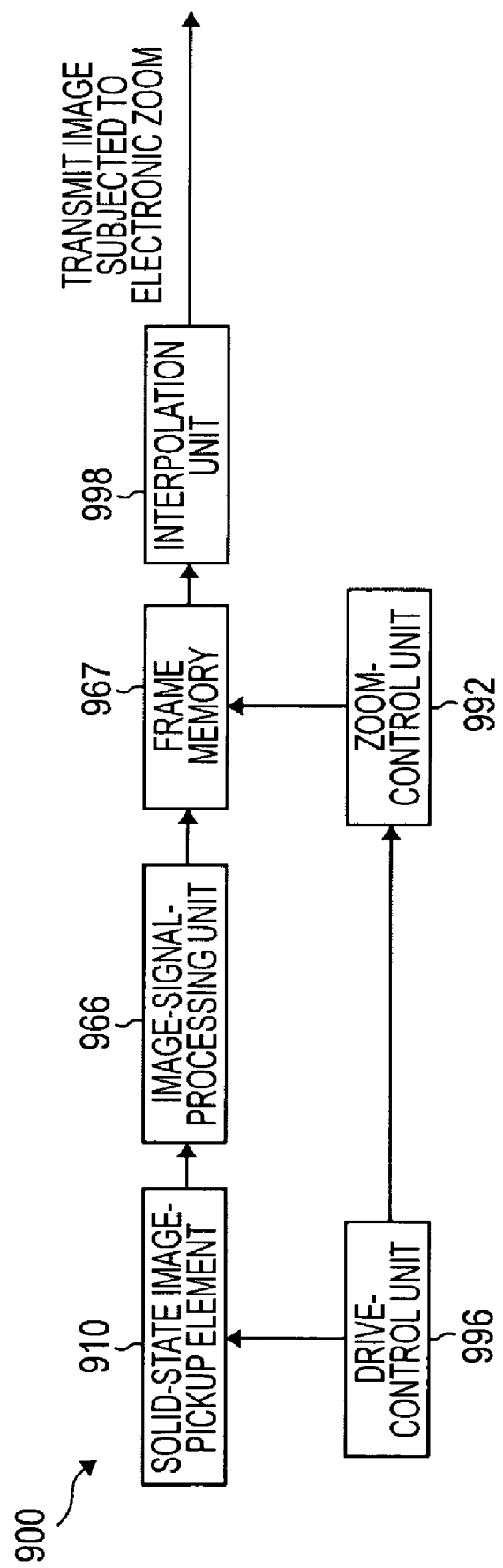
FIG. 5 shows a known zoom function.

FIG. 5 shows a known configuration of the system that can achieve the electronic-zoom function by using the frame memory. FIG. 6 illustrates an interpolation method achieved by using the frame memory.

As shown in FIG. 5, in a known image-pickup device 900, a solid-state image-pickup element 910 reads and transmits a pixel signal to an image-signal-processing unit 966 provided at the post stage of the solid-state image-pickup element 910 under the control of a drive-control unit 996 that operates in concert with a zoom-control unit (a device-control section) configured to control an electronic-zoom operation. FIG. 5 does not show function parts provided for performing the correlated double sampling, the A/D conversion, and so forth.

Pixel data subjected to predetermined signal processing in the image-signal-processing unit 966 is temporarily stored in a frame memory 967. Here, the frame memory 967 is configured to store data on all of the pixels corresponding to a single frame. However, where data on an image magnified with the zoom magnification 2:1 is required, the frame memory 967 reads and stores only the data corresponding to part of the area of the solid-state image-pickup element 910.

Then, pixel data is read from the frame memory 967 at a predetermined time according to an instruction transmitted from a zoom-control unit (a memory-control section) 992 configured to control the electronic-zoom operation and transmitted to an interpolation unit 998 provided at the post stage of the frame memory 967.

The interpolation unit 998 provides gaps responsive to the zoom magnification under the control of the zoom-control unit (an interpolation-control section) 992, generates an interpolation signal in each of the gaps by performing signal processing, and generates an image of the same size as that of an original image.

For example, the interpolation unit 998 performs vertical-filtering processing by using pixel data corresponding to at least two lines adjacent to a pixel that is to be interpolated and that is responsive to the zoom magnification, so as to have a predetermined number of lines. Namely, the interpolation unit 998 changes the number of vertical pixels into a predetermined number, thereby performing resolution conversion in a vertical direction. Further, the interpolation unit 998 performs horizontal filtering by using pixel data that is provided on one and the same line and that is adjacent to the pixel to be interpolated and that is responsive to the zoom magnification. Subsequently, the number of horizontal pixels is changed to a predetermined number, whereby resolution conversion in a horizontal direction is performed. Accordingly, information of an image subjected to electronic-zoom processing is transmitted from the interpolation unit 998.

Here, this system leaves pixel signals being transmitted from the solid-state image-pickup element 910 irrespective of the frame magnification. Therefore, for reading data while interpolating a gap between the lines of a cutout area at the time where image enlargement is performed, the frame memory 967 is used, so as to reduce a time lag caused by the line interpolation.

Namely, where the enlargement-zoom processing is performed, image-pickup signals read from the image-pickup device in succession are stored in a line memory in sequence. At the same time, a predetermined number of line-data items are read, so as to generate line data by performing the interpolation (vertical-resolution conversion), where the line data is in short supply at the time where the enlargement-zoom processing is performed. Subsequently, the vertical interpolation is achieved. Where the vertical interpolation is performed in real time, a large memory such as a frame memory configured to maintain lien data subjected to the vertical-zoom processing is required. For example, since the pixel signals are left being transmitted from the solid-state image-pickup element 910 to the image-signal-processing unit 966, a memory that can store data on the valid pixels corresponding to one-second of lines of valid pixels (480 lines) is required, at the time where the zoom magnification is 2:1.

For example, FIG. 6A shows a map representing a valid area in a two-dimensional manner, where the valid area is picked up by the solid-state image-pickup element 910. The solid-state image-pickup element 910 of the first embodiment is an image-pickup device of about 1.3 M pixels, where the image-pickup device includes 1280 pixels in a horizontal direction and 960 lines in a vertical direction.

The frame memory 967 reads and stores data on the pixels of the solid-state image-pickup element 910 in the order in which the pixels are arranged. Further, where the electronic-zoom function is performed, the frame memory 967 stores at least the pixel data corresponding to a used area extending in a vertical direction of an image area used at the time where the electronic-zoom function is performed according to the zoom magnification. For example, where the zoom magnification is 2:1, the frame memory 967 stores data on the pixels corresponding to 480 lines at the center part of the image area, where the image area is viewed along a vertical direction, as shown in FIG. 6B. Under normal conditions, data on the pixels corresponding to 960 lines are stored in the frame memory 967. Namely, where the zoom magnification is 2:1, the frame memory 967 stores the pixel data corresponding to one-second of that stored under normal conditions.

Further, as shown in FIG. 6C, the interpolation unit 998 reads pixel data from the line memory, where the pixel data corresponds to at least two lines adjacent to a pixel that is to be interpolated and that is responsive to the zoom magnification, and performs vertical filtering by performing interpolation by using the pixel data on the at least two lines. Namely, the interpolation unit 998 changes the number of vertical pixels into a predetermined number by using original pixel data corresponding to at least two lines adjacent to the pixel that is to be interpolated and that is responsive to the zoom magnification, or horizontal-interpolation data obtained by performing horizontal interpolation, whereby vertical-direction resolution conversion is performed.

For performing vertical interpolation by using the pixel data read from the solid-state image-pickup element 910 in sequence, a unit configured to store the pixel data read from the solid-state image-pickup element 910 by as much as at least two lines is required for interpolating an insertion line (a difference line).

Next, the interpolation unit 998 temporarily stores the pixel data that had been subjected to the vertical-direction resolution conversion (line data) into a line memory (not shown). Namely, at least one pixel signal is transmitted from the solid-state image-pickup element 910 and temporarily stored in the frame memory 967, where the pixel signal corresponds to an area (e.g., the center part of a screen) used at the time where the electronic-zoom function is performed. Then, the frame memory transfers the pixel signal to the interpolation unit 998 while controlling the transfer timing, and the interpolation unit 998 performs interpolation, whereby horizontal interpolation is achieved.

For example, as shown in FIG. 6D, the interpolation unit 998 performs horizontal filtering using interpolation only for the area corresponding to 640 pixels at the center part of the image area, where the image area is viewed along a horizontal direction, as shown in FIG. 6D. Here, the 640 pixels correspond to one-second of the entire 1280 pixels provided along the horizontal direction. Namely, the interpolation unit 998 changes the number of horizontal pixels into a predetermined number by using the original pixel data corresponding to one and the same line adjacent to a pixel that is to be interpolated and that is responsive to the zoom magnification, thereby performing horizontal-direction resolution conversion.

However, performing the above-described known electronic-zoom processing requires at least two functions of storing the details on transmitted data (line memories). For example, a large-scale storage unit such as a frame memory including a large circuit configured to store the pixel data that corresponds to a single frame and/or at least one line responsive to the zoom magnification is required. Further, a digital-processing LSI configured to perform pixel interpolation (the interpolation unit 998) is also required, which increases the number of hardware units. Subsequently, the circuit configuration becomes large. Further, for controlling reading of pixel data transmitted from a large storage unit such as a frame memory, difficult control such as generating gaps required for achieving interpolation is performed. Subsequently, the circuit configuration of the zoom-control unit becomes complicated and large scale.

As described above, the above-described system becomes large scale, high power, and costly. Therefore, it is difficult to use the above-described system, as a solid-state image-pickup device configured to perform the electronic-zoom processing by using a single sensor chip (an image-pickup device), where the solid-state image-pickup device includes an electronic-zoom unit used for forming a mobile phone, a camera used for a mobile device, and so forth that should be cost effective and small in size.

On the other hand, according to the example operations of the first embodiment performed by the image-pickup device 1 shown in FIG. 1, the pixel data is left being transmitted from the solid-state image-pickup element 2 irrespective with the zoom magnification (zoom in and/or out). However, as shown in FIG. 4A, the solid-state image-pickup element 2 transmits the access-line-address signal responsive to the zoom magnification to the external circuit 200. Therefore, the external circuit 200 can acquire only the data corresponding to at least one valid line of the image-pickup data D0 transmitted from the solid-state image-pickup element 2 by referring to the access-line-address signal and perform zoom processing. Subsequently, it becomes possible to perform the zoom processing without using the frame memory.

In the past, for example, a memory that can store the pixel data corresponding to a single frame is provided, at the post stage of the image-signal processing unit, and where an image is zoomed in, unnecessary data is abandoned and necessary data is interpolated. Further, where the image is zoomed out, the abandoned data is used. The above-described processing is performed after the maximum amount of data is stored in the memory.

On the other hand, according to the first embodiment, information about the zoom magnification (zoom in and/or out) is transmitted to the control-and-signal-processing unit 17 of the image-pickup device 1 in advance (at the previous frame, for example). Further, the internal calculation circuit calculates a line (direction H) to be accessed and read for necessary data according to the zoom magnification. Then, data on the calculated line (direction H) is externally transmitted, at the appropriate time. That is to say, the image-pickup device (image sensor) functions, as the frame memory so that the frame memory becomes unnecessary.

Further, where the calculation circuit is provided on the signal-processing side (the LSI provided on the control side, such as the DSP), as is the case with known camera systems, communications between the calculation circuit and the image sensor become complicated. Where data is read during the zoom processing is performed, necessary data (line) and unnecessary data (line) are mixed with each other due to the characteristic of the image sensor. However, where a line shutter is used, the entire lines should be accessed. Therefore, it becomes possible to control the known image sensor by using a vertical-synchronization signal XVS and the vertical-synchronization signal XHS. Further, where the zoom-operation is performed, a shutter-control signal and a read signal should be interfaced independently. According to the first embodiment, however, the shutter-control signal and the read signal are generated by performing internal calculation so that the communication interface is simplified.

Further, the external circuit 200 is informed of information indicating that the zoom processing is performed and information indicating the zoom magnification. Therefore, as shown in FIG. 4B, the external circuit 200 can acquire the valid-line data alone of the image-pickup data D0 transmitted from the solid-state image-pickup element 2 and perform the zoom processing. Therefore, information about validity and/or invalidity may not be transmitted to the external circuit 200.

However, where the information about validity and/or invalidity is transmitted to the external circuit 200, the above-described calculation circuit is not required for performing post-stage signal-processing and the internal-calculation function can be used.

For example, where the frame memory is not provided when performing the post-stage signal-processing, a CMOS solid-state image-pickup element configured to perform line-shutter processing and data reading should control the line-shutter-control signal and the read-control signal independently, where the zoom processing is performed. Where the external circuit 200 controls the above-described two signals, two types of interfaces are required, which makes the system configuration complicated. In that case, the line-shutter-control signal and the read-control signal for a line to be accessed are generated in the image sensor according to information about the zoom magnification transmitted from the external circuit 200 and data is read, whereby the zoom processing can be performed by using a simplified interface. Further, since the internally generated information (the information about the line to be accessed) is externally transmitted, the post-stage signal processing including color processing and black-level initialization can be performed by using the internally generated information.

<Second Embodiment>
(Operations of Image-Pickup Device)

Figure 7:
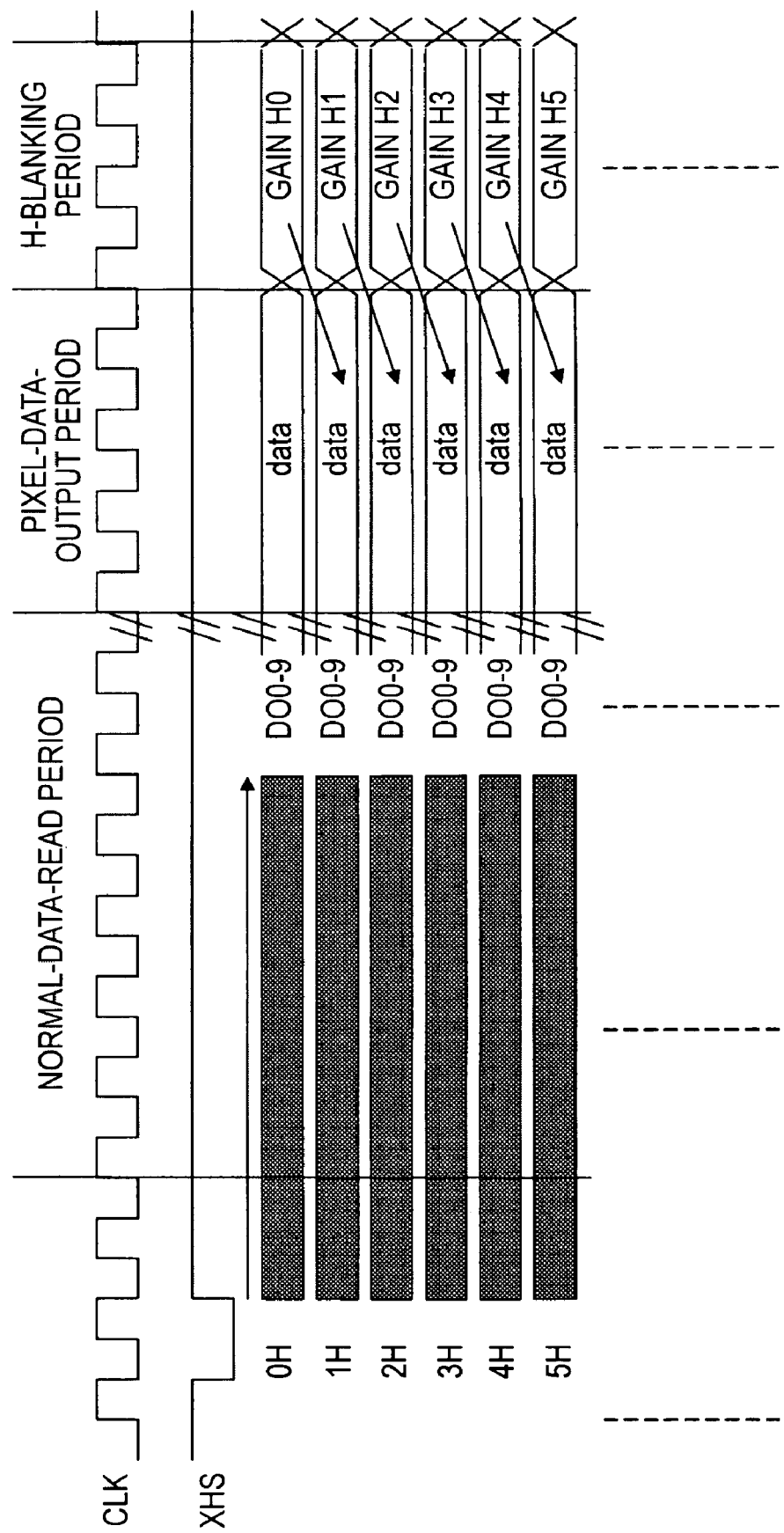
FIG. 7 is a timing chart illustrating operations according to another embodiment of the present invention, where the operations are performed by the image-pickup device shown in FIG. 1.

FIG. 7 is a timing chart illustrating operations of a second embodiment of the present invention, where the operations are performed by the image-pickup device 1 shown in FIG. 1. FIG. 7 shows an example technology for achieving a dynamic-range-enlargement function.

In the past, gain adjustment in frames is performed in the solid-state image-pickup element 2 and/or the external circuit 200, so as to achieve the dynamic-range-enlargement function. However, according to the second embodiment, gain adjustment is performed in lines by the solid-state image-pickup element 2. That is to say, where the dynamic-range-enlargement function of the second embodiment is performed, the details on the gain adjustment vary from line to line. The solid-state image-pickup element 2 transmits gain-setting information about each of the lines to the external circuit 200. Then, the external circuit 200 performs correction processing by referring to the transmitted gain-setting information, whereby an image with a wide dynamic range is generated.

Therefore, according to the second embodiment, the external-communication IF-circuit unit 174 transmits line-gain information indicating the gain-setting value of a target line to the external circuit 200 in real time, as an operation-state signal, by using the horizontal-blanking period, as shown in FIG. 7. Here, the operation-state signal is generated, as several bits (e.g., four bits) of digital data obtained after valid data is externally transmitted.

The image with the wide dynamic range may be generated after the gain-adjustment processing is performed for each of the lines by the external circuit 200. In that case, however, the solid-state image-pickup element 2 performs processing by using a low-level signal for a line with low brightness, which is unfavorable in terms of a signal-to-noise (S/N) ratio. On the other hand, according to the second embodiment, the gain adjustment is performed for each of the line by the solid-state image-pickup element 2 in advance. Subsequently, the signal corresponding to the low-brightness line is amplified with a predetermined gain so that the level of the signal becomes high. After that, desired processing can be performed, which is favorable in terms of the S/N ratio.

<Third Embodiment>
(Operations of Image-Pickup Device)

Figure 8:
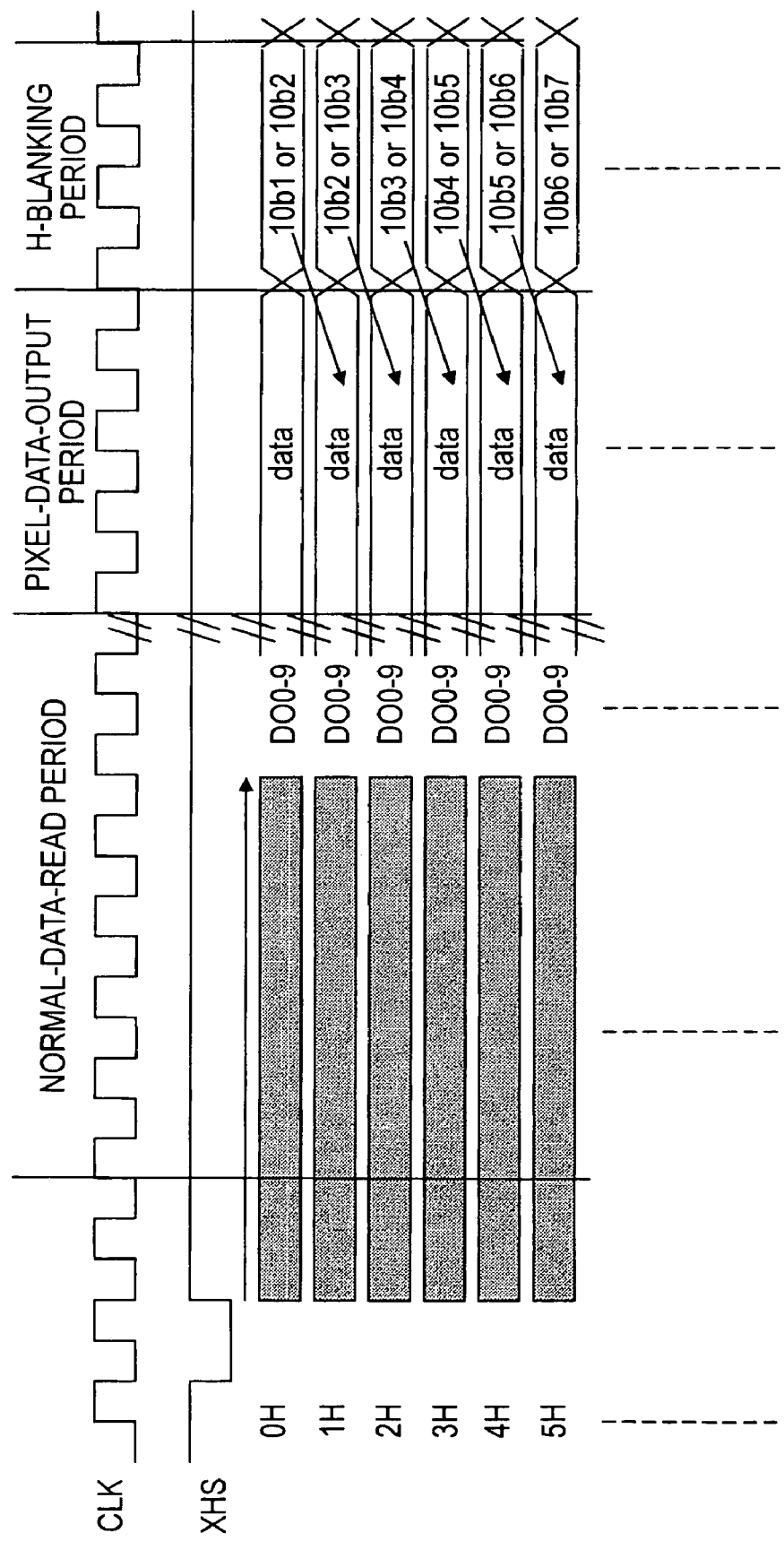
FIG. 8 is a timing chart illustrating operations according to another embodiment of the present invention, where the operations are performed by the image-pickup device shown in FIG. 1.

FIG. 8 is a timing chart illustrating operations according to a third embodiment of the present invention, where the operations are performed by the image-pickup device 1 shown in FIG. 1. FIG. 8 shows the example where address information about an accessed line H and/or address information related to the line H is transmitted to the external circuit 200.

According to the details on signal processing performed by the external circuit 200, not only information about the pixels corresponding to the line currently accessed, but also information about a pixel preceding the current line by as much as several pixels is often required. For example, the preceding-pixel information is required, where signal processing is performed for at least two lines by using several lines of data. The signal processing includes the color processing, the black-level adjustment, and so forth.

Therefore, according to the operations of the third embodiment, the preceding-pixel information is transmitted to the external circuit 200 before the current line is accessed, so as to perform the above-described color-processing, black-level adjustment, and so forth. For example, as shown in FIG. 8, the external-communication I/F circuit unit 174 transmits information about a vertical (V) and horizontal (H) address representing the current line by using the horizontal-blanking period. Further, the external-communication I/F circuit unit 174 transmits information about a vertical (V) and horizontal (H) address representing a related line required for referring to the preceding-pixel information to the external circuit 200 in real time, as an operation-state signal. The operation-state signal is generated, as several bits (e.g., four bits) of digital data obtained after the valid data corresponding to a line immediately preceding the current line is externally transmitted.

<Fourth Embodiment>
(Operations of Image-Pickup Device)

Figure 9:
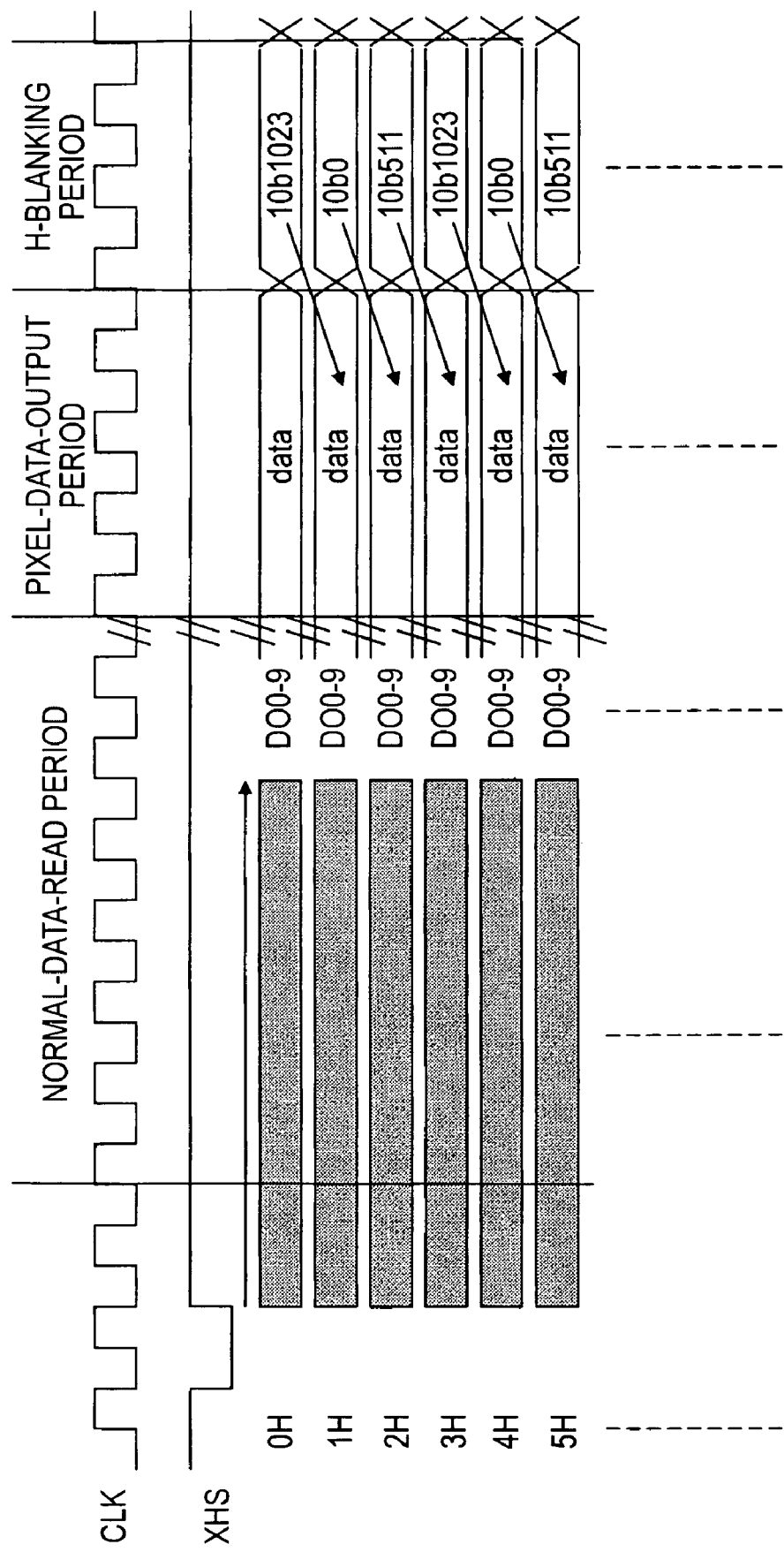
FIG. 9 is a timing chart illustrating operations according to another embodiment of the present invention, where the operations are performed by the image-pickup device shown in FIG. 1.

FIG. 9 is a timing chart illustrating operations according to a fourth embodiment of the present invention, where the operations are performed by the image-pickup device 1 shown in FIG. 1. FIG. 9 shows the example where the external circuit 200 interpolates the result of interpolation performed by the correction-circuit unit 180 provided in the solid-state image-pickup element 2.

Where the correction-circuit unit 180 corrects a vertical stripe noise caused by a defective pixel that occurs in the image-pickup unit 10 and/or the circuit configuration of the column-processing unit 21, a difference including correction omission, overcorrection, and so forth often occurs at a boundary area, where the difference is referred to as a boundary difference. The external circuit 200 corrects the boundary difference.

Therefore, according to the operations of the fourth embodiment, the external-communication I/F-circuit unit 174 transmits an operation-state signal to the external circuit 200 before the current line is accessed. The operation-state signal indicates information about a clamp level and/or a gain corrected by the correction-circuit unit 180 (hereinafter collectively referred to as correction-in-element-result information), and/or information about the correction amount, the correction position, and so forth. Since the operation-state signal is transmitted in advance, the color-processing, the black-level adjustment, and so forth can be performed by using the operation-state signal.

For example, as shown in FIG. 9, the correction-in-element-result information, the correction-amount information, the correction-position information, and so forth are transmitted to the external circuit 200 in real time, as an operation-state signal generated, as several bits (e.g., four bits) of digital data obtained after the valid data is externally transmitted, by using the horizontal-blanking period. The external circuit 200 corrects the boundary difference that occurs after the correction-circuit unit 180 performs the correction processing by referring to the correction-in-element-result information, the correction-amount information, the correction-position information, and so forth that are transmitted to the external circuit 200.

The boundary difference can be reduced by making the correction-circuit unit 180 highly sophisticated. In that case, however, the highly-sophisticated circuit becomes large scale and high power. Since the above-described system becomes large scale, high power, and costly, it is difficult to use the above-described system, as a solid-state image-pickup device configured to perform correction flawlessly by using a single sensor chip (an image-pickup device), so as to achieve a camera or the like used for a mobile phone and/or a mobile device that should be cost effective and small in size.

On the other hand, by performing the operations of the fourth embodiment, the external circuit 200 can interpolate the difference that occurs after the correction-circuit unit 180 performs the correction with reference to the correction-in-element-result information, the correction-amount information, the correction-position information, and so forth that are transmitted to the external circuit 200. Namely, it becomes possible to achieve an image-pickup device configured to perform correction flawlessly than ever. Here, the image-pickup device performs the flawless correction not by using the single sensor chip (the image-pickup device), but by performing the correction in concert with the external circuit 200.

<Fifth Embodiment>
(Operations of Image-Pickup Device)

Figure 10:
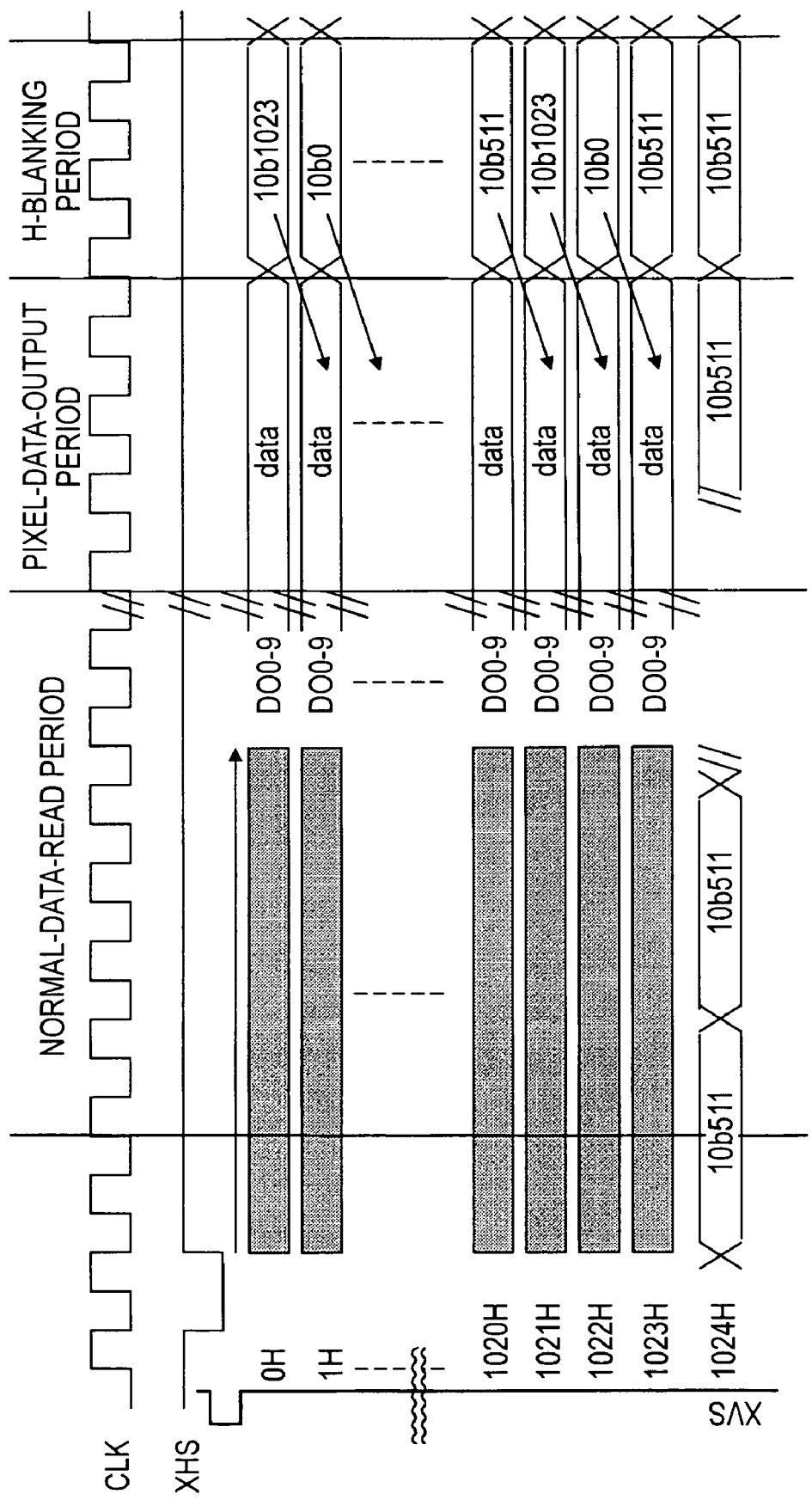
FIG. 10 is a timing chart illustrating operations according to another embodiment of the present invention, where the operations are performed by the image-pickup device shown in FIG. 1.
Figure 11:
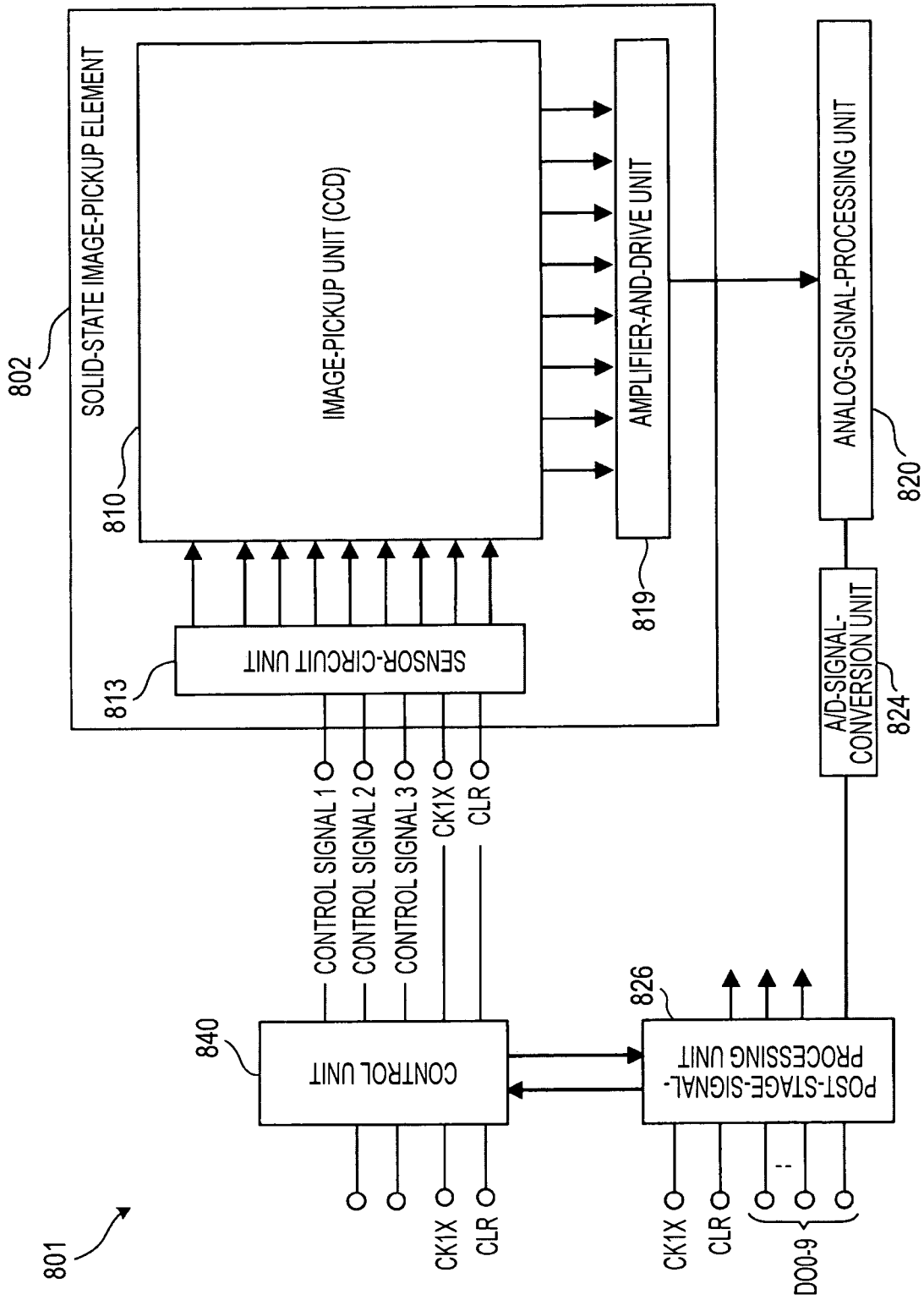
FIG. 11 illustrates an example image-pickup device using an ordinary CCD image-pickup element.
Figure 12:
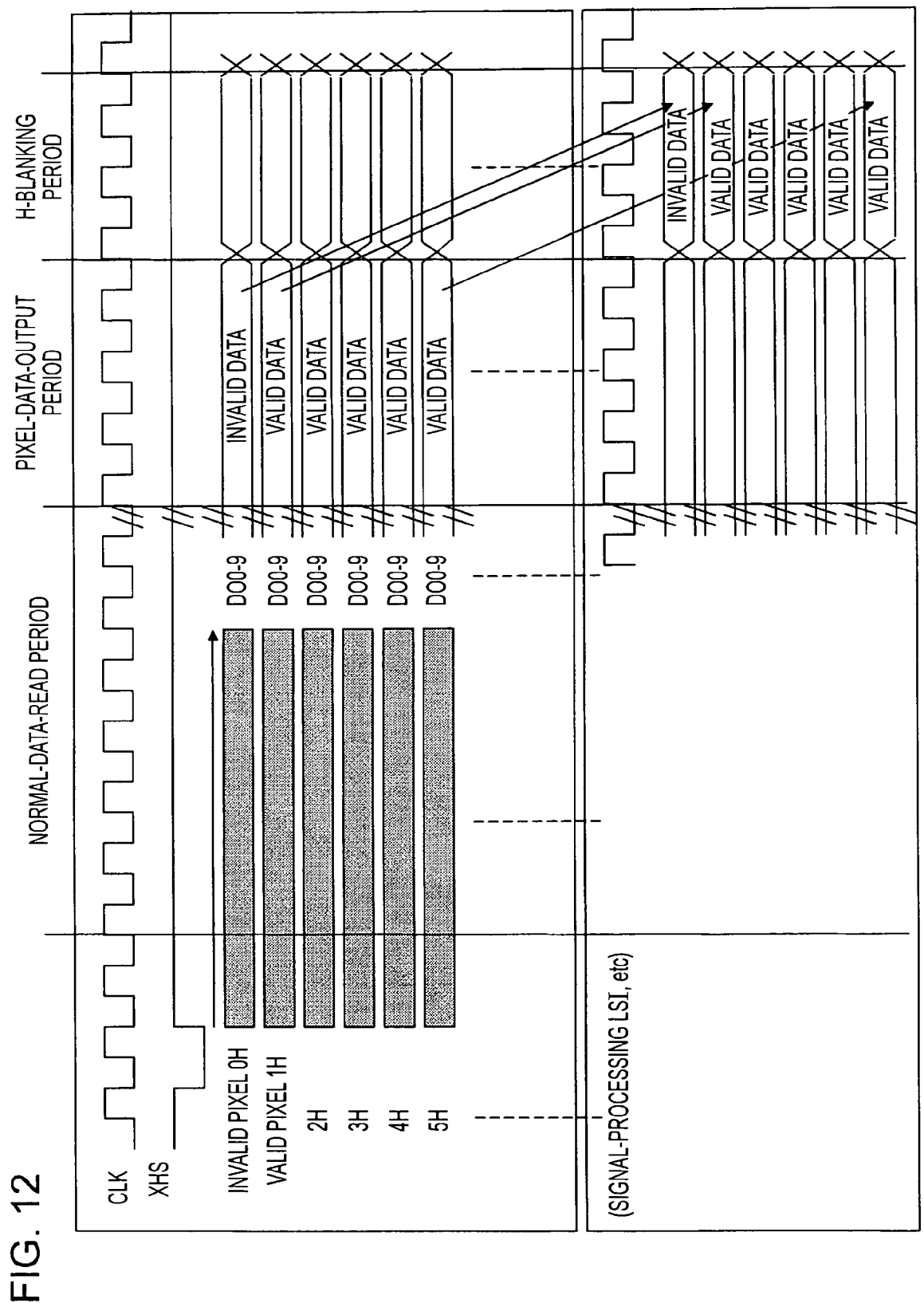
FIG. 12 is a timing chart illustrating example operation timing of the image-pickup device shown in FIG. 11.
Figure 13:
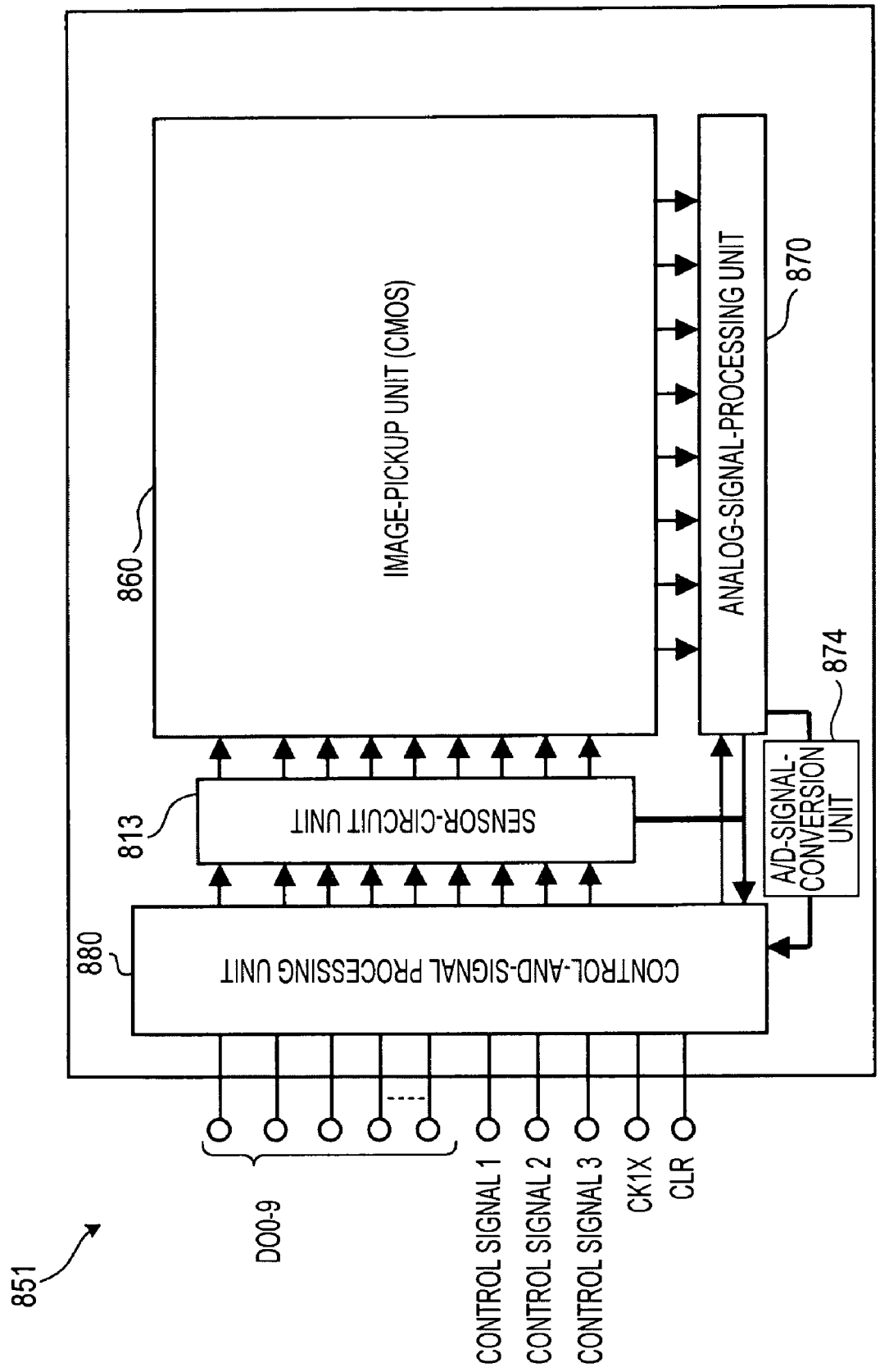
FIG. 13 shows an example image-pickup device using an ordinary CMOS image-pickup element.

FIG. 10 is a timing chart illustrating operations according to a fifth embodiment of the present invention. The operations of the fifth embodiment are performed by the image-pickup device 1 shown in FIG. 1. FIG. 10 shows the example where an operation-state signal that can be used for confirming the internal operations of the solid-state image-pickup element 2 is transmitted to the external circuit 200 by using not only the horizontal-blanking period but also the vertical-blanking period.

The operations shown in FIG. 10 are a modification of the operations according to the fourth embodiment shown in FIG. 9. Namely, the solid-state image-pickup element 2 transmits the correction-in-element-result information, the correction-amount information, the correction-position information, and so forth to the external circuit 200 in real time, as an operation-state signal by using not only the horizontal-blanking period, but also the period corresponding to several lines (a single line in the fifth embodiment) of the vertical-blanking period. Here, the operation-state signal is generated, as a several bits (e.g., four bits) of digital data. The operation-state signal is added after valid data is externally transmitted. As is the case with the fourth embodiment, the external circuit 200 corrects a boundary difference that occurs after the correction-circuit unit 180 performs correction by referring to the correction-in-element-result information, the correction-amount information, the correction-position information, and so forth that are transmitted thereto.

Here, the solid-state image-pickup element 2 transmits the operation-state signal to the external circuit 200 by using not only the horizontal-blanking period but also the period corresponding to the several lines of the vertical-blanking period, that is, a normal-data-read period. By using the vertical-blanking period, signals controlled in frames are subjected to processing that varies from line to line. Further, the signals can be subjected to processing of which control method changes from frame to frame, where the processing includes gain adjustment, for example. Still further, the signals can be controlled not only in horizontal directions but also in vertical directions.

Further, according to the fifth embodiment shown in FIG. 10, the solid-state image-pickup element 2 transmits the operation-state signal thereof to the external circuit 200 not only in the horizontal-blanking period but also the period corresponding to the several lines of the vertical-blanking period. However, the solid-state image-pickup element 2 may transmit the operation-state signal only in the period corresponding to the several lines of the vertical-blanking period, and not in the horizontal-blanking period. In that case, the signals controlled in frames are not subjected to processing that varies from line to line. Namely, the signals are subjected to processing in frames, which reduces unnecessary power consumption. The above-described control includes shutter control or the like. It is easier to control signals in frames than to control signals in horizontal directions.

Thus, according to the fifth embodiment, the operation-state information of the solid-state image-pickup element 2 is transmitted to the signal-processing unit (the external circuit 200) provided at the post stage of the solid-state image-pickup element 2, whereby the processing load on the signal-processing unit can be reduced. For example, the gate size, the chip size, and the current consumption of the signal-processing unit are prevented from being increased due to the increased number of functions. Further, the circuits required for understanding and reproducing the operations of the solid-state image-pickup element 2 are provided with the same gate size, chip size, and current consumption as those in the past. Subsequently, it becomes possible to provide a new function that was not provided in the past.

Thus, the present invention has been described with reference to the embodiments thereof. However, the technical scope of the present invention is not limited to those of the above-described embodiments. That is to say, the above-described embodiments can be changed and/or modified without leaving the gist of the present invention. Therefore, the changed and/or modified embodiments are included in the technical scope of the present invention.

Further, the above-described embodiments of the present invention do not limit the present invention disclosed in the attached claims and all of the combinations of features described in the embodiments are not necessary for achieving the present invention. The above-described embodiments describe the present invention at various stages and various inventions can be extracted therefrom by the combined use of elements disclosed therein. Although several elements are removed from all of the elements disclosed in the above-described embodiments, the configuration thereof, that is, a configuration from which the several elements are removed can be extracted, as another embodiment of the present invention, as long as the configuration achieves the same effect as that of the configuration including all of the elements disclosed in the embodiments.

For example, according to the above-described embodiments, where the operation information and the unit signal of the semiconductor device are externally transmitted from a common output terminal, the operation information and the unit signal are transmitted in a time-division manner so that the operation signal is externally transmitted in the blanking period after the data-output period in which the unit signal is externally transmitted. However, without being limited to the above-described configuration, the output configuration can be changed in various ways.

For example, data representing the operation information (e.g., four bits of additional data) may be superimposed on data representing the unit signal (e.g., ten bits of pixel data) so that the operation information is externally transmitted, as fourteen bits of data. That is to say, the operation information and the unit signal may be collectively converted into a single signal and the single signal may be externally transmitted from the common-output terminal at any time. In that case, however, a circuit block configured to collectively convert the operation information and the unit signal into a single signal is required, which increases the circuit size of the semiconductor device.

Further, the above-described embodiments exemplarily illustrate the CMOS sensor and the CCD sensor including the pixel unit configured to generate a signal electric charge by receiving light, as an example solid-state image-pickup device that can read a signal transmitted from each of the unit pixels. However, the signal electrical charge can be generated not only by light but also an electromagnetic wave including an infrared ray, an ultraviolet ray, an X-ray, and so forth. Therefore, a semiconductor device including at least one unit component including many elements arranged in a predetermine manner, where each of the elements receives the electromagnetic wave and externally transmits the analog signal corresponding to the amount of the electromagnetic wave, can be used for the above-described embodiments.

Further, in the image-pickup unit 10, the two unit-signal-generation units may not be arranged in a two-dimensional manner. For example, the unit-signal-generation units may be arranged in a rectangular shape. For example, where at least one line sensor is used in place of the image-pickup unit 10, the technologies described in the above-described embodiments can be used for the line sensor and the same advantages as those in the above-described embodiments can be obtained.

Further, "being arranged in the rectangular shape" means that the unit-signal-generation units are arranged in a rectangle shape having short sides and long sides, where the difference in length between the short sides and the long sides is significant. Therefore, without being limited to a typical line sensor including unit-signal-generation units in a single line, the unit-signal-generation units can be arranged in at least two lines, a zigzag line, and so forth.

Further, according to the above-described embodiments, in the solid-state image-pickup device, the external circuit 200 performs the signal processing of which details vary from line to line, such as the gain adjustment, the zoom processing, and so forth relating to the dynamic-range enlargement by referring to the internal-operation information transmitted from the solid-state image-pickup element 2. However, the configurations described in the above-described embodiments can be used not only for the solid-state image-pickup device but also for every electronic apparatus that performs desired signal processing in concert with a semiconductor device and a signal-processing unit provided outside the semiconductor device.

For example, the above-described embodiments illustrate the image-pickup device including the CMOS and/or CCD solid-state image-pickup element that has sensitivity to an externally transmitted electromagnetic wave including light, an X-ray, and so forth. However, the configurations described in the above-described embodiments can be used for any system and/or apparatus that can detect variations in physical quantity. Therefore, a fingerprint-identification apparatus configured to detect a fingerprint image based on variations in the electrical characteristic and/or optical characteristic on the basis of pressure, without being limited to light. The fingerprint-identification apparatus is disclosed in Japanese Unexamined Patent Application Publication No. 2002-7984, Japanese Unexamined Patent Application Publication No. 2001-125734, and so forth. Thus, the above-described configurations can be used for signal processing performed in a system configured to detect other physical variations.

It should be understood by those skilled in the art that various modifications, combinations, sub-combinations and alterations may occur depending on design requirements and other factors insofar as they are within the scope of the appended claims or the equivalents thereof. For instance, the pixels of the solid-state imaging device, the operation-information-output portion and a signal-processing portion which performs a predetermined signal processing on the pixel signals from said plurality of pixels by referring to the operation information may all be formed on a same chip.

What is claimed is:

1. A signal-processing method adapted to perform predetermined signal processing on at least one unit signal transmitted from at least one semiconductor device that includes at least two unit components arranged in a predetermined order, where each of the unit components includes at least one detection unit configured to detect change information responsive to a change in an incident physical quantity and at least one unit-signal-generation unit configured to generate the unit signal based on the change information, and that detects a distribution of the physical quantity, the signal-processing method comprising the steps of:

receiving the unit signal and operation information of the semiconductor device from the semiconductor device in an external signal processing unit, said operation information relating to a least a zoom function of the semiconductor device;

performing the predetermined signal processing on the unit signal, by the external signal processing unit, based on the operation information; and receiving, into the external signal processing unit, a thinning signal from the semiconductor device which indicates the meaning of the next unit signal sent from the semiconductor device, wherein,
the operation information is transmitted during a horizontal blanking period of a horizontal period during which the unit signal is transmitted from the semiconductor device to the external signal processing unit.

2. The signal-processing method according to claim 1, wherein the operation information and the unit signal are externally transmitted from one and the same output terminal in a time-division manner.

3. The signal-processing method according to claim 1, wherein the operation information is transmitted after the unit signal is transmitted in the horizontal period.

4. The signal-processing method according to claim 1, wherein the predetermined signal processing is correction processing adapted to correct the unit signal and information indicating an amount and/or a result of the correction achieved by the correction processing is output, as the operation information.

5. A signal-processing system configured to perform predetermined signal processing on at least one unit signal transmitted from at least one semiconductor device that includes at least two unit components arranged in a predetermined order, where each of the unit components includes at least one detection unit configured to detect change information responsive to a change in an incident physical quantity and at least one unit-signal-generation unit configured to generate the unit signal based on the change information, and that detects a distribution of the physical quantity, the signal-processing system comprising:

an operation-information-output unit that is provided in the semiconductor device and that is configured to output operation information of the semiconductor device from the semiconductor device and a thinning signal, said operation information relating to a least a zoom function of the semiconductor device and said thinning signal indicating the meaning of the next unit signal sent from the semiconductor device; and a signal-processing unit external to the semiconductor device that receives the unit signal and the operation information from the semiconductor device and performs the predetermined signal processing on the unit signal based on the operation information, wherein,
the operation-information-output unit outputs the operation information during a horizontal blanking period of a horizontal period during which the unit signal is transmitted from the semiconductor device to the signal-processing unit.

6. The signal-processing system according to claim 5, wherein the semiconductor device includes a common output terminal configured to externally transmit the operation information and the unit signal in a time-division manner.

7. The signal-processing system according to claim 5, wherein the operation-information-output unit transmits the operation information after the unit signal is transmitted in the horizontal period.

8. The signal-processing system according to claim 5, wherein
the signal-processing unit performs correction processing adapted to correct the unit signal, as the predetermined signal processing, and
the operation-information-output unit outputs information indicating an amount and/or a result of the correction performed through the correction processing, as the operation information.

9. A semiconductor apparatus that includes at least two unit components arranged in a predetermined order, where each of the unit components includes at least one detection unit configured to detect change information responsive to a change in an incident physical quantity and at least one unit-signal-generation unit configured to generate a unit signal based on the change information, and that detects a distribution of the physical quantity, the semiconductor apparatus comprising:

a semiconductor device with an operation-information-output unit configured to output operation information of the semiconductor device and a thinning signal, said operation information relating to a least a zoom function of the semiconductor device and said thinning signal indicating the meaning of the next unit signal sent from the semiconductor device; and a signal processing unit external to the semiconductor device that receives the unit signal and the operation information and performs the predetermined signal processing on the unit signal in the signal-processing unit based on the operation information, wherein,
the operation-information-output unit outputs the operation information during a horizontal blanking period of a horizontal period during which the unit signal is transmitted from the semiconductor device to the signal processing unit.

10. The semiconductor apparatus according to claim 9, further comprising a common output terminal configured to externally transmit the operation information and the unit signal in a time-division manner.

11. The semiconductor apparatus according to claim 9, wherein the operation-information-output unit outputs the operation information after the unit signal is transmitted in the horizontal period.

12. The semiconductor apparatus according to claim 9, further comprising a signal-processing unit wherein
the signal-processing unit performs correction processing adapted to correct the unit signal, and
the operation-information-output unit outputs information indicating an amount and/or a result of the correction performed through the correction processing, as the operation information.

13. The semiconductor apparatus according to claim 9, wherein the semiconductor apparatus is a camera.

14. An imaging device comprising:
a plurality of pixels each of which includes a detection portion configured to detect incident light and a signal-generation portion configured to generate a pixel signal based on an amount of the incident light,
an operation-information-output portion configured to output operation information of the imaging device and a thinning signal, said operation information relating to a least a zoom function of the imaging device and said thinning signal indicating the meaning of the next pixel signal; and
a signal-processing portion external to the imaging device that receives the pixel signal and the operation information and which performs a predetermined signal processing on the pixel signals from said plurality of pixels based on the operation information,
wherein,
the operation-information-output portion outputs the operation information during a horizontal blanking period of a horizontal period during which the pixel signal is transmitted from the image device to the signal-processing portion.

* * * * *